US011246034B2

(12) United States Patent
Andres et al.

(10) Patent No.: US 11,246,034 B2
(45) Date of Patent: Feb. 8, 2022

(54) SECURE COMMUNICATION OF ACCESS INFORMATION VIA MOBILE DEVICES

(71) Applicant: GOOGLE LLC, Mountain View, CA (US)

(72) Inventors: Miguel Andres, San Francisco, CA (US); Aram Ayazyan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 261 days.

(21) Appl. No.: 16/412,366

(22) Filed: May 14, 2019

(65) Prior Publication Data
US 2019/0349770 A1 Nov. 14, 2019

Related U.S. Application Data

(60) Provisional application No. 62/671,397, filed on May 14, 2018.

(51) Int. Cl.
| H04W 12/08 | (2021.01) |
| G06Q 20/40 | (2012.01) |
| H04L 29/06 | (2006.01) |
| H04W 12/04 | (2021.01) |

(52) U.S. Cl.
CPC ............ *H04W 12/08* (2013.01); *G06Q 20/40* (2013.01); *H04L 63/10* (2013.01); *H04W 12/04* (2013.01)

(58) Field of Classification Search
CPC ...... H04W 12/04; H04W 12/08; G06Q 20/32; G06Q 20/351; G06Q 20/40; G06Q 20/027; H04L 63/10; G06F 21/34; G06F 21/33

USPC .......................................................... 726/4
See application file for complete search history.

(56) References Cited

U.S. PATENT DOCUMENTS

| 9,608,970 | B1 * | 3/2017 | Gehret .................. H04L 63/062 |
| 2014/0344153 | A1 | 11/2014 | Raj et al. |
| 2015/0312038 | A1 | 10/2015 | Palanisamy |
| 2018/0108008 | A1 | 4/2018 | Chumbley |
| 2018/0295134 | A1 * | 10/2018 | Gupta ..................... H04L 67/28 |
| 2018/0367518 | A1 * | 12/2018 | Singh ...................... H04L 63/10 |
| 2019/0163460 | A1 * | 5/2019 | Kludy ........................ G06F 8/63 |
| 2019/0349344 | A1 * | 11/2019 | Thomas ............ H04W 12/0471 |

OTHER PUBLICATIONS

Sardjoe "International Search Report and Written Opinion issued in International Application No. PCT/US2019/032312", dated Aug. 8, 2019, 19 pages.

* cited by examiner

*Primary Examiner* — Benjamin A Kaplan
(74) *Attorney, Agent, or Firm* — Dority & Manning, P.A.

(57) ABSTRACT

An account management system receives, from a user computing device, a request for a virtual access card and a user account identifier associated with an account hub system account. The system receives, from the account hub computing system, account hub system account metadata associated with the user account hub system account. The system transmits, to the account hub computing system, a request for an access card identifier and a virtual access payload. The system receives, from the account hub computing system, the access card identifier and the virtual access payload. The system provides, to the user computing device, the access card identifier and the virtual access payload, the user computing device communicating the access card identifier and the virtual access payload to a reader computing device via a wireless communication channel.

20 Claims, 9 Drawing Sheets

SECURE COMMUNICATION OF ACCESS INFORMATION VIA MOBILE DEVICES

CROSS-REFERENCE TO RELATED APPLICATION

This patent application claims priority to U.S. Patent Application No. 62/671,397, filed May 14, 2018, and entitled "Using A Mobile Device to Present Transit Account Information." The entire contents of the above-identified application are hereby fully incorporated herein by reference.

TECHNICAL FIELD

The technology disclosed herein relates to systems that provide access by receiving data via wireless communication between a user computing device and a reader computing device.

BACKGROUND

Account-based access systems may store user account information and access permission information in the cloud and use a presentment mechanism, such as a mobile device, to present an account identifier of a user account. Conventional systems are moving service request technology from a stored value model to an account/cloud-based model. More specifically, instead of embedding a balance into a physical card or device used by users to process service requests, access systems are moving such balance to the cloud and using cards to convey an account identifier related to the user's balance on the cloud. Conventional account management systems may support stored value schemes on mobile devices. However, conventional access and account management systems do not allow a mobile devices to present information to process access requests to access reader devices associated with multiple access systems that use varying communication protocols in a secure manner.

SUMMARY

Techniques herein provide computer-implemented methods to provide access information to reader computing devices, comprising: by one or more computing devices, receiving, from a user computing device, a user account identifier and a request for a virtual access card corresponding to the user account identifier, the user account identifier associated with an access system account; transmitting, to an access computing system corresponding to the access system account, a request for an access card identifier and an access key based on the received user account identifier; receiving, from the access computing system, the access card identifier and the access key, the access card identifier and the access key being formatted based on a communication protocol corresponding to a reader computing device utilized by the access computing system; and transmitting the access card identifier and the access key to the user computing device, the user computing device communicating the access card identifier and the access key to the reader computing device via a wireless communication channel.

In certain other example aspects described herein, systems to provide access information for communication to reader computing devices are provided, comprising: a storage device; a processor communicatively coupled to the storage device, wherein the processor executes application code instructions that are stored in the storage device to cause the system to: receive a user account identifier and a request to generate a first virtual access card, the user account identifier associated with an access system account; in response to receiving the request, transmit, to one or more computing devices, the user account identifier and the request; receive, from the one or more computing devices, the first access card identifier and the first access key, the first access card identifier and the first access key being formatted based on a communication protocol corresponding to a reader computing device utilized by the access computing system; associate the first access card identifier with the first access key; store the first access card identifier and the first access key on a memory, the memory comprising two or more access card identifiers including the first access card identifier and two or more access keys including the first access key; detecting a tap of the system to a reader computing device; determining the communication protocol corresponding to the reader computing device based on data received from the reader computing device; selecting the first access card identifier from the stored two or more access card identifiers and the first access key from the stored two or more access keys based on the determined communication protocol; communicating the first access card identifier and the first access key to the reader computing device via a wireless communication channel.

In certain other example aspects described herein, computer program products to provide access information to reader computing devices are provided, comprising: a non-transitory computer-readable medium having computer-executable program instructions embodied thereon that when executed by computer cause the computer to: receive, from a user computing device, a user account identifier and a request for a virtual access card corresponding to the user account identifier, the user account identifier associated with an access system account; transmit, to an access computing system corresponding to the access system account, a request for an access card identifier and an access key based on the received user account identifier; receive, from the access computing system, the access card identifier and the access key, the access card identifier and the access key being formatted based on a communication protocol corresponding to a reader computing device utilized by the access computing system; and transmit the access card identifier and the access key to the user computing device, the user computing device communicating the access card identifier and the access key to the reader computing device via a wireless communication channel These and other aspects, objects, features, and advantages of the examples will become apparent to those having ordinary skill in the art upon consideration of the following detailed description of illustrated examples.

DETAILED DESCRIPTION OF EXAMPLES

Overview

Figure 1:
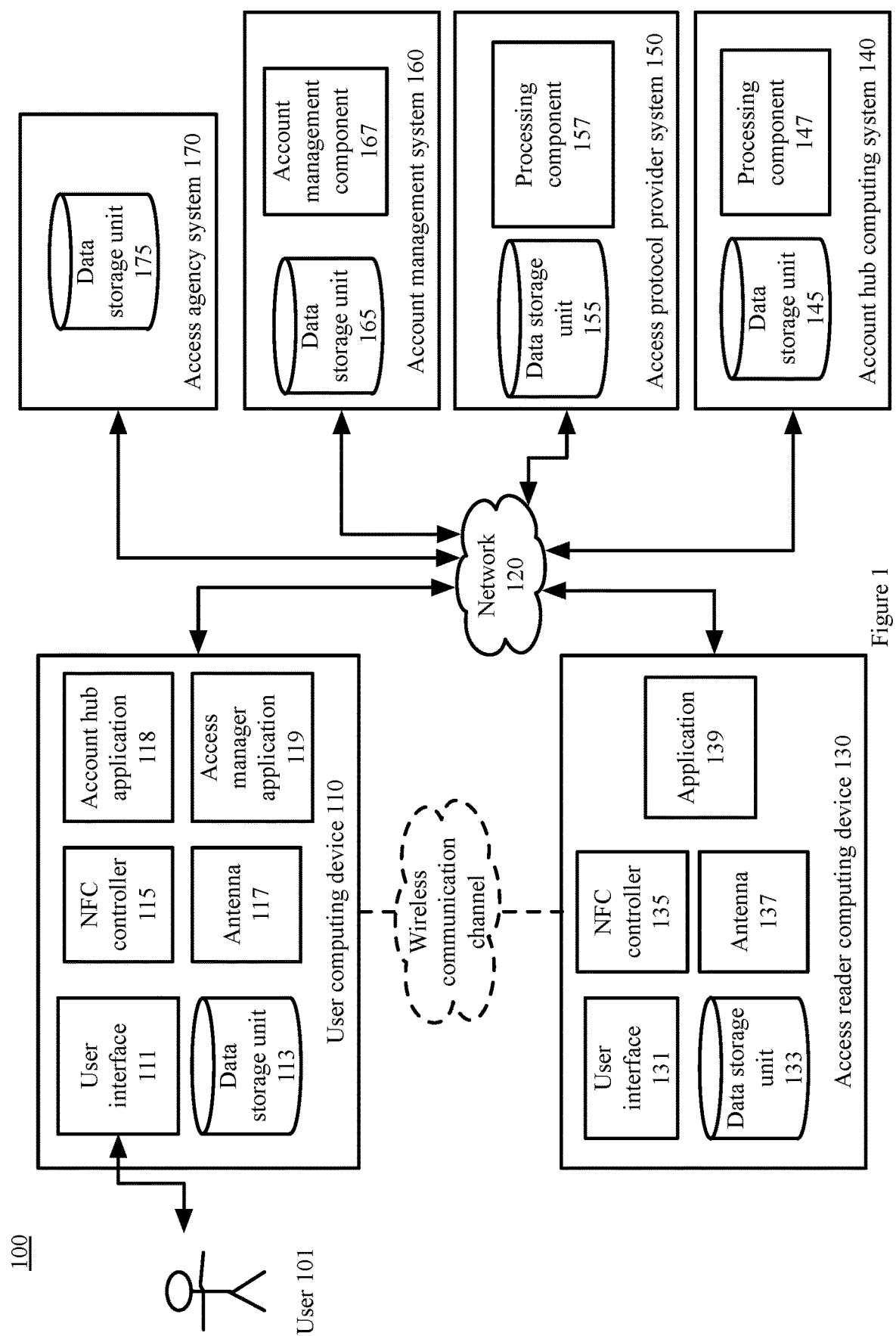
FIG. 1 is a block diagram depicting a system to provide, to a user computing device via an account management system, virtual access payloads for access permissions associated with account hub computing systems, in accordance with certain examples.

The examples described herein provide computer-implemented techniques to provide, to a user computing device via an account management system, virtual access payloads for access permissions associated with account hub computing systems.

A user establishes an account with an account hub computing system and establishes an account with an account management system. The user requests creation of a virtual access card for the account hub computing system using an account hub application on the user computing device. The account management system requests and receives an access card identifier and virtual access payload from the account hub computing system in response to the user requesting creation of the virtual access card and provides the access card identifier and the virtual access payload to the user computing device for communication to an access reader computing device via a wireless communication tap. In some examples, the account management system, in response to the access manager application detecting a refresh event based on timestamp data, location data, or a user request, requests and receives an updated virtual access payload for the access card identifier from the account hub computing system and provides the updated virtual access payload to the user computing device. To obtain access via the access reader computing device, the user taps the user computing device to the access reader computing device to communicate the access card identifier and the virtual access payload to the access reader computing device, which provides access to the user based on the validity of the access card identifier and the virtual access payload. Examples of providing access include opening a gate to a physical area, enabling user use of the access reader computing device, enabling user use of a device communicatively coupled to the access reader computing device, processing one or more service requests, providing data to the user computing device, or executing other appropriate processes or outputs controlled by the access reader computing device.

The systems, methods, and computer program products described herein provide, to a user computing device via an account management system, virtual access payloads for access permissions associated with account hub computing systems. As such the systems and methods described herein may increase convenience to a user by providing a single account with which to manage access permissions associated with multiple account hub computing systems, especially when the multiple account hub computing systems provide different wireless communication protocols. The systems and methods described herein provide updated virtual access payloads for access permissions associated with account hub computing systems in response to detecting a refresh event based on location data, timestamp data, or a user request. As such, the systems and methods described herein increase the security of the virtual access payload by decreasing the lifespan of the virtual access payload. The systems and methods described herein provide a cloud-based access system with a user computing device that does not require a secure element. As such, the systems and methods described herein are applicable to user computing devices that do not comprise a secure element in addition to user computing devices that comprise a secure element.

Example System Architecture

Turning now to the drawings, in which like numerals indicate like (but not necessarily identical) elements throughout the figures, examples are described in detail.

FIG. 1 is a block diagram depicting a system 100 to provide, to a user computing device 110 via an account management system 160, virtual access payloads for access permissions associated with account hub computing systems 140, in accordance with certain examples. As depicted in FIG. 1, the system 100 includes network computing devices 110, 130, 140, 150, and 160 that are configured to communicate with one another via one or more networks 120. In some examples, a user associated with a device must install an application and/or make a feature selection to obtain the benefits of the techniques described herein.

In examples, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy ("BLE"), near field communication ("NFC"), ultrasound communication, or any combination thereof or any other appropriate architecture or system that facilitates the communication of signals, data, and/or messages. Throughout the discussion of examples, it should be understood that the terms "data" and "information" are used interchangeably herein to refer to text, images, audio, video, or any other form of information that can exist in a computer-based environment.

Each network computing device 110, 130, 140, 150, and 160 includes a device having a communication module capable of transmitting and receiving data over the network 120. Each network computing device 110, 130, 140, 150, and 160 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example depicted in FIG. 1, the network computing devices 110, 130, 140, 150, and 160 are operated by users 101, access reader computing device 130 operators, account hub computing system 140 operators, access protocol provider system 150 operators, and access management system 160 operators, respectively.

A user computing device 110 comprises a user interface 111, a data storage unit 113, an NFC controller 115, an antenna 117, an account hub application 118, and an access manager application 119. The user computing device 110 communicates with an account hub computing system 140 via the network 120. The user computing device 110 communicates with an account management system 160 via the network 120.

The user interface 111 enables the user 101 to interact with the user computing device 110. The user interface 111 may be a touch screen, a voice-based interface, or any other interface that allows the user 101 to provide input and receive output from an account hub application 118, an access manager application 119, and other applications on the user computing device 110. The user 101 interacts via the user interface 111 with the account hub application 118 to request a virtual access card for a user account hub system account that can be integrated into an access manager application 119. The user 101 interacts via the user interface 111 to select the access manager application 119, wherein selecting the access manager application 119 enables the access manager application 119 to establish a wireless communication channel between the user computing device 110 and the access reader computing device 130 to communicate an access card identifier and a virtual access payload to the access reader computing device 130. Selecting the access manager application 119 may comprise selecting one or more user interface 111 objects displayed via the access manager application 119 to instruct the access manager application 119 to communicate with the NFC controller 115 to activate an NFC field to enable the establishment of the wireless communication channel.

The data storage unit 113 comprises a local or remote data storage structure accessible to the user computing device 110 suitable for storing information. The data storage unit 133 stores encrypted information, such as HTML5 local storage. The data storage unit 113 stores one or more access card identifiers, each access card identifier associated with a respective access reader computing device 130. The data storage unit 113 stores a virtual access payload associated with each respective access card identifier.

In an example, the NFC controller 115 is capable of sending and receiving data, performing authentication and ciphering functions, and directing how the user computing device 110 will listen for transmissions from an access reader computing device 130 or configuring the user computing device 110 into various power-save modes according to NFC-specified procedures. In another example, an RFID controller of the user computing device 110 is capable of sending and receiving data, performing authentication and ciphering functions, and directing how the user computing device 110 will listen for transmissions from the access reader computing device 130 or configuring the user computing device 110 into various power-save modes according to RFID-specified procedures. In another example, the user computing device 110 comprises a Bluetooth controller, Bluetooth low energy ("BLE") controller, ultrasound controller, infrared controller, or a Wi-Fi controller capable of performing similar functions. An NFC controller 115 communicates with the access manager application 119 and/or the account hub application 118 and is capable of sending and receiving data over a wireless, NFC communication channel established with an access reader computing device 130. In another example, an RFID controller, a Bluetooth controller, BLE controller, ultrasound controller, infrared controller, or Wi-Fi controller performs similar functions as the NFC controller 115 using RFID, Bluetooth, BLE, or Wi-Fi protocols. The NFC controller 115 of the user computing device 110 activates the antenna 117 to create a wireless communication channel between the user computing device 110 and the access reader computing device 130. The user computing device 110 communicates with the access reader computing device 130 via the antenna 117. When the user computing device 110 has been activated, the NFC controller 115 of the user computing device 110 polls through the antenna 117 a radio signal, or listens for radio signals from the access reader computing device 130. In another example, when the user computing device 110 has been activated, the RFID controller, Bluetooth controller, BLE controller, Wi-Fi controller, or other wireless communication controller of the user computing device 110 polls through the antenna 117 a radio signal, or listens for radio signals from the access reader computing device 130.

The antenna 117 is a means of communication between the user computing device 110 and the access reader computing device 130. The NFC controller 115 outputs through the antenna 117 a radio signal, or listens for radio signals from the access reader computing device 130. In another example, an RFID controller, Bluetooth controller, a BLE controller, or Wi-Fi controller of the user computing device 110 outputs through the antenna 117 a radio signal, or listens for radio signals from the access reader computing device 130.

The account hub application 118 is a program, function, routine, applet, or similar entity that exists on and performs its operations on the user computing device 110. In certain examples, the user 101 associated with the user computing device 110 must install the account hub application 118 and/or make a feature selection on the user computing device 110 to obtain the benefits of the techniques described herein. The user 101 may access the account hub application 118 on the user computing device 110 via the user interface 111 The account hub application 118 may be associated with an account hub computing system 140. The user computing device 110 comprises multiple account hub applications 118, each account hub application 118 associated with a respective account hub computing system 140. The account hub application 118 communicates a request to the access manager application 119 on the user computing device 110 to create a virtual access card for the account hub computing system 140 in the access manager application 119.

The access manager application 119 is a program, function, routine, applet, or similar entity that exists on and performs its operations on the user computing device 110. In certain examples, the user 101 associated with the user computing device 110 must install the access manager application 119 and/or make a feature selection on the user computing device 110 to obtain the benefits of the techniques described herein. The user 101 may access the access manager application 119 on the user computing device 110 via the user interface 111. The access manager application 119 may be associated with an account management system 160. The access manager application 119 receives a request from the account hub application 118 to create a virtual access card for the account hub computing system 140 in the access manager application 119 and communicates the received request to the account management system 160. The access manager application 119 receives an access card identifier and a corresponding virtual access payload from the account management system 160. The access manager application 119 detects a refresh event for the virtual access payload based on timestamp data, location data, other user computing device 110 data, or based on one or more inputs of the user 101 to the user computing device 110 and transmits a notification of the refresh event for the virtual access payload to the account management system 160. In this example, the access manager application 119 receives an updated virtual access payload for the access card identifier from the account management system 160 in response to transmitting the notification of the refresh event for the virtual access payload. The access manager application 119 establishes a wireless communication channel with the access reader computing device 130 in response to the user 101 selecting, via the user computing device 110 one or more objects on the user interface 111 and communicates the virtual access payload and the access card identifier to the reader computing device 130 via the wireless communication channel. In another example, the access manager application 119 causes the user computing device 110 to display the virtual access payload and the access card identifier via the user interface 111 in the form of a dynamic barcode in response to the user 101 selecting, via the user computing device 110 one or more objects on the user interface 111.

The user computing device 110 communicates with an account hub computing system 140 and account management system 160 via a network 120. The user computing device 110 communicates with an account hub computing system 140 to establish a user account hub system account and to download an account hub application 118. The user computing device 110 communicates with the account management system 160 to download an access manager application 119. The access manager application 119 communicates with the account management system 160 to request and to receive an access card identifier and a virtual access payload for the user account hub system account. The user computing device 110 communicates with an access reader computing device 130 via a wireless communication channel to communicate the access card identifier and the virtual access payload to the access reader computing device 130 via the wireless communication channel. In another example, the user computing device 110 displays a dynamic barcode representing the access card identifier and the virtual access payload, the user 101 presents the dynamic barcode to the access reader computing device 130, and the access reader computing device 130 reads the access card identifier and the virtual access payload by scanning the dynamic barcode.

An example access reader computing device 130 comprises a user interface 131, a data storage unit 133, an NFC controller 135, an antenna 137, and an application 139. The access reader computing device 130 comprises a computing device that controls access to a physical area. The access reader computing device 130 may be configured to open and close a door, a gate, a window, or other access to a physical area for users 101 who present a valid virtual access payload to the access reader computing device 130 using a user computing device 110 via a wireless communication channel. The access reader computing device 130 comprises a computing device at a transit toll station. The access reader computing device 130 configured to access restricted data stored on the data storage unit 113 for users 101 who present a valid virtual access payload to the access reader computing device 130 using a user computing device 110 via a wireless communication channel. In other examples, the access reader computing device 130 comprises any other computing device that receives, via an NFC communication channel or other wireless communication channel, a valid virtual access payload and conducts a process via a network 120 by communicating with one or more other computing devices. The access reader computing device 130 emits a radio signal comprising a predetermined frequency via the antenna 137 that activates NFC controller 115 of user computing device 110 when the user computing device 110 is tapped to the access reader computing device 130. The access reader computing device 130 receives a modified radio signal emitted by the user computing device 110 and then determines a difference between the radio signal and the modified radio signal to determine the access card identifier and the virtual access payload.

The user interface 131 enables a reader computing device 130 operator to interact with the reader computing device 130. The user interface 131 may be a touch screen, a voice-based interface, or any other interface that allows the reader computing device 130 operator to provide input and receive output from an application 139 on the reader computing device 130. The reader computing device 130 operator interacts via the user interface 131 with the application 139 to configure the reader computing device 130 to emit radio signals of a specified frequency so that tapping the transponder device 110 to the reader computing device 130 results in reception of the transponder device 110 identifier by the reader computing device 130 via an NFC communication channel.

The data storage unit 133 comprises a local or remote data storage structure accessible to the access reader computing device 130 suitable for storing information. The data storage unit 133 stores encrypted information, such as HTML5 local storage.

The NFC controller 135 is capable of sending and receiving data, performing authentication and ciphering functions, and directing how the access reader computing device 130 will listen for transmissions from one or more user computing devices 110 or configuring the access reader computing device 130 into various power-save modes according to NFC-specified procedures. In another example, the reader computing device 130 comprises an RFID controller, a Bluetooth controller, a Bluetooth low energy ("BLE") controller, or a Wi-Fi controller capable of performing similar functions. An example NFC controller 135 communicates with the application 139 and is capable of sending and receiving data over a wireless, NFC communication channel. In another example, a Bluetooth controller, BLE controller, or Wi-Fi controller performs similar functions as the NFC controller 135 using RFID, Bluetooth, BLE, or Wi-Fi protocols. The NFC controller 135 controller of the access reader computing device 130 activates the antenna 137 to create a wireless communication channel between the access reader computing device 130 and the user computing device 110. The access reader computing device 130 communicates with the user computing device 110 via the antenna 137. When the access reader computing device 130 has been activated, the NFC controller 135 of the access reader computing device 130 polls through the antenna 137 a radio signal, or listens for radio signals from the user computing device 110.

The antenna 137 is a means of communication between the access reader computing device 130 and the user computing device 110. In an example, the NFC controller 135 outputs through the antenna 137 a radio signal, or listens for radio signals from the user computing device 110. In another example an RFID controller, a Bluetooth controller, a BLE controller or a Wi-Fi controller is used.

The application 139 is a program, function, routine, applet, or similar entity that exists on and performs its operations on the access reader computing device 130. The access reader computing device 130 operator may install the application 139 and/or make a feature selection on the access reader computing device 130 to obtain the benefits of the techniques described herein. The access reader computing device 130 operator may access the application 139 on the access reader computing device 130 via the user interface 131. The application 139 may be associated with an account hub computing system 140, an access protocol provider system 150, and/or an account management system 160. The application 139 comprises a service application, a point of sale device application, an application that controls access to restricted physical areas and/or restricted data, or other application 139 that receives a virtual access payload and conducts a process, provides a service, or provides an output based on a validity of the virtual access payload or requests another device or system to conduct a process provide a service, or provide an output.

An example account hub computing system 140 comprises a data storage unit 145 and a processing component 147. The account hub computing system 140 manages a user account hub system account and communicates with an account management system 160 and receives a request to generate or obtain an access card identifier and a virtual access payload for the user account hub system account. The account hub computing system 140 comprises an access hub computing system.

The data storage unit 145 comprises a local or remote data storage structure accessible to the account hub computing system 140 suitable for storing information. The data storage unit 145 stores encrypted information, such as HTML5 local storage. The data storage unit 145 comprises a table, a database, or other data structure comprising a stored list of user account hub system account identifiers corresponding to user account hub system accounts and user 101 account identifiers, access card identifiers, and virtual access payloads associated with the user account hub system account.

The processing component 147 receives, from the user computing device 110, a request for one or more user 101 access permissions and either grants or denies the user 101 access permissions. In an example, the processing component 147 generates the access card identifier and the virtual access payload and transmits the access card identifier and the virtual access payload to the account management system 160. In another example, the processing component 147 requests an access card identifier and a virtual access payload from an access protocol provider system 150, receives the access card identifier and the virtual access payload generated by the access protocol provider system 150 from the access protocol provider system 150, and communicates the access card identifier and the virtual access payload to the account management system 160. The processing component 147 receives, from the account management system 160, a request for an updated virtual access payload for the access card identifier, generates (or otherwise obtains from the access protocol provider system 150) an updated virtual access payload, and transmits the updated virtual access payload to the account management system 160 via the network 120.

An example access protocol provider system 150 comprises a data storage unit 155 and a manufacturing component 157. The access protocol provider system 150 provides an NFC protocol or other wireless communication protocol for use by the access reader computing device 130. In certain examples, the account hub computing system 140 performs one or more functions described herein as being performed by the access protocol provider system 150. In other examples, the access protocol provider system 150 performs one or more functions described herein as being performed by the account hub computing system 140.

The data storage unit 155 comprises a local or remote data storage structure accessible to the access protocol provider system 150 suitable for storing information. The data storage unit 155 stores encrypted information, such as HTML5 local storage. The data storage unit 155 stores access card identifiers and associated virtual access payloads (or updated virtual access payloads) in the data storage unit 155.

The processing component 157 receives a request from the account hub computing system 140 via the network 120 to generate an access card identifier and a virtual access payload for the user account hub system account, generates the access card identifier and the virtual access payload, and transmits the access card identifier and the virtual access payload to the account hub computing system 140. The processing component 157 receives a request from the account hub computing system 140 via the network 120 to generate an updated virtual access payload for the access card identifier, generates the updated virtual access payload, and transmits the updated virtual access payload to the account hub computing system 140.

An example account management system 160 comprises a data storage unit 165 and an account management component 167. The account management system 160 manages a user 101 account and communicates with an access manager application 119 on the user computing device 110 associated with the user 101 account. The account management system 160 enables the user 101 to store virtual access cards for one or more respective user account hub system accounts associated with one or more account hub computing systems 140 on the access manager application. An example virtual access card corresponding to a user account hub system account comprises an access card identifier and an associated virtual access payload.

The data storage unit 165 comprises a local or remote data storage structure accessible to the account management system 160 suitable for storing information. The data storage unit 165 stores encrypted information, such as HTML5 local storage. The data storage unit 165 stores one or more access card identifiers, each access card identifier associated with a user account hub system account. The data storage unit 165 stores one or more virtual access payloads, each virtual access payload associated with an access card identifier.

The account management component 167 receives a request, via the network 120, to generate a virtual access card for a user account hub system account from the access manager application 119. The account management component 167 transmits a request for a virtual access payload, a user 101 account identifier, and a user account hub system account identifier to the account hub computing system 140 via the network 120. The account management component 167 receives the virtual access payload and an access card identifier from the account hub computing system 140 and communicates the virtual access payload and the access card identifier to the user computing device 110 via the network 120. The account management component 167 receives, from the access manager application 119, a notification of a refresh event for the virtual access payload associated with the access card identifier, transmits the access card identifier and a request for an updated virtual access payload to the account hub computing system 140, receives an updated virtual access payload for the access card identifier from the account hub computing system 140, and communicates the updated virtual access payload for the access card identifier to the user computing device 110 via the network 120.

Figure 9:
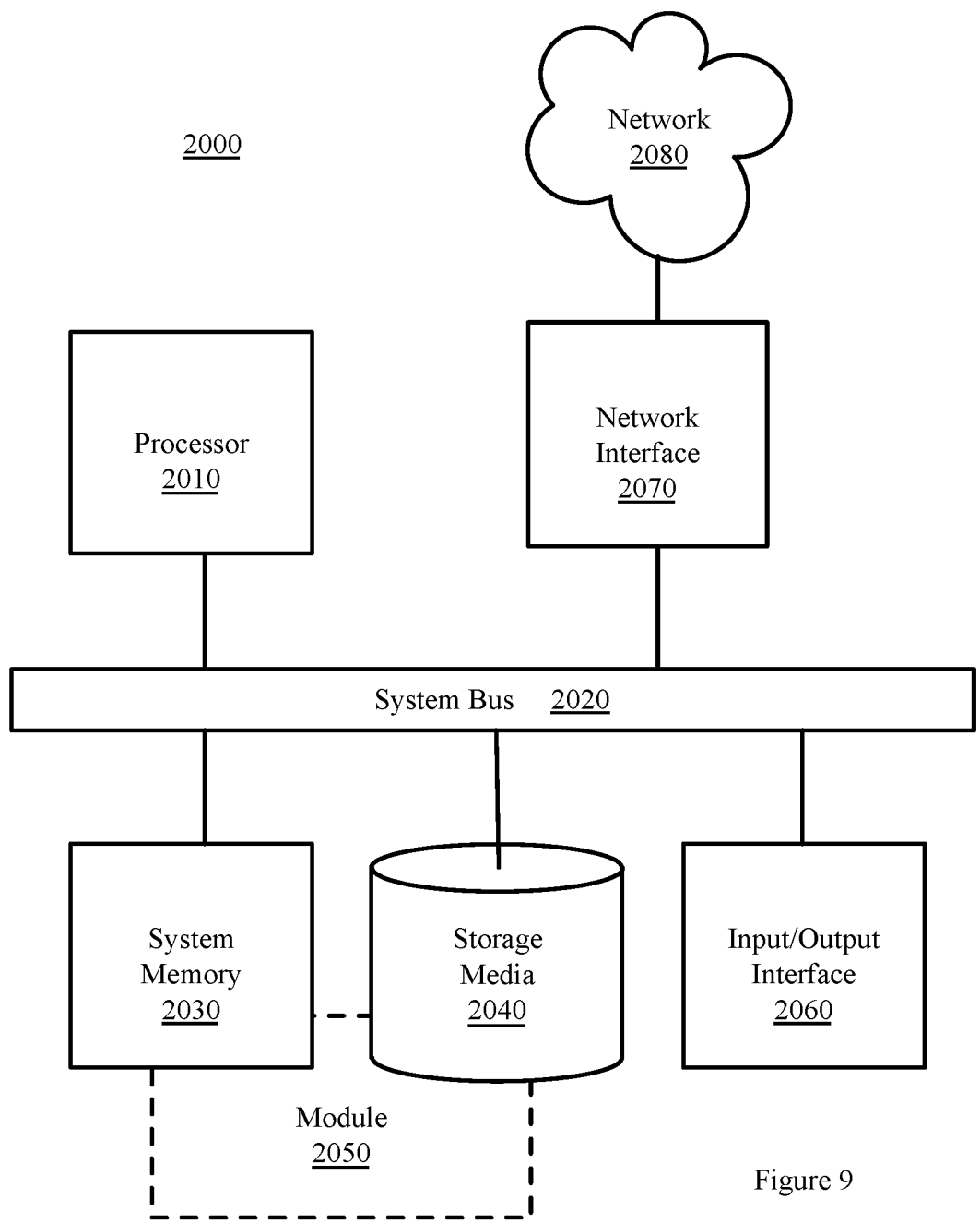
FIG. 9 is a block diagram depicting a computing machine and module, in accordance with certain examples.

In examples, the network computing devices and any other computing machines associated with the technology presented herein may be any type of computing machine such as, but not limited to, those discussed in more detail with respect to FIG. 9. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 9. The computing machines discussed herein may communicate with one another, as well as with other computing machines or communication systems over one or more networks, such as network 120. The network 120 may include any type of data or communications network, including any of the network technology discussed with respect to FIG. 9.

Example Processes

The example methods illustrated in FIGS. 2-8 are described hereinafter with respect to the components of the example operating environment 100. The example methods of FIGS. 2-8 may also be performed with other systems and in other environments. The operations described with respect to any of the FIGS. 2-8 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
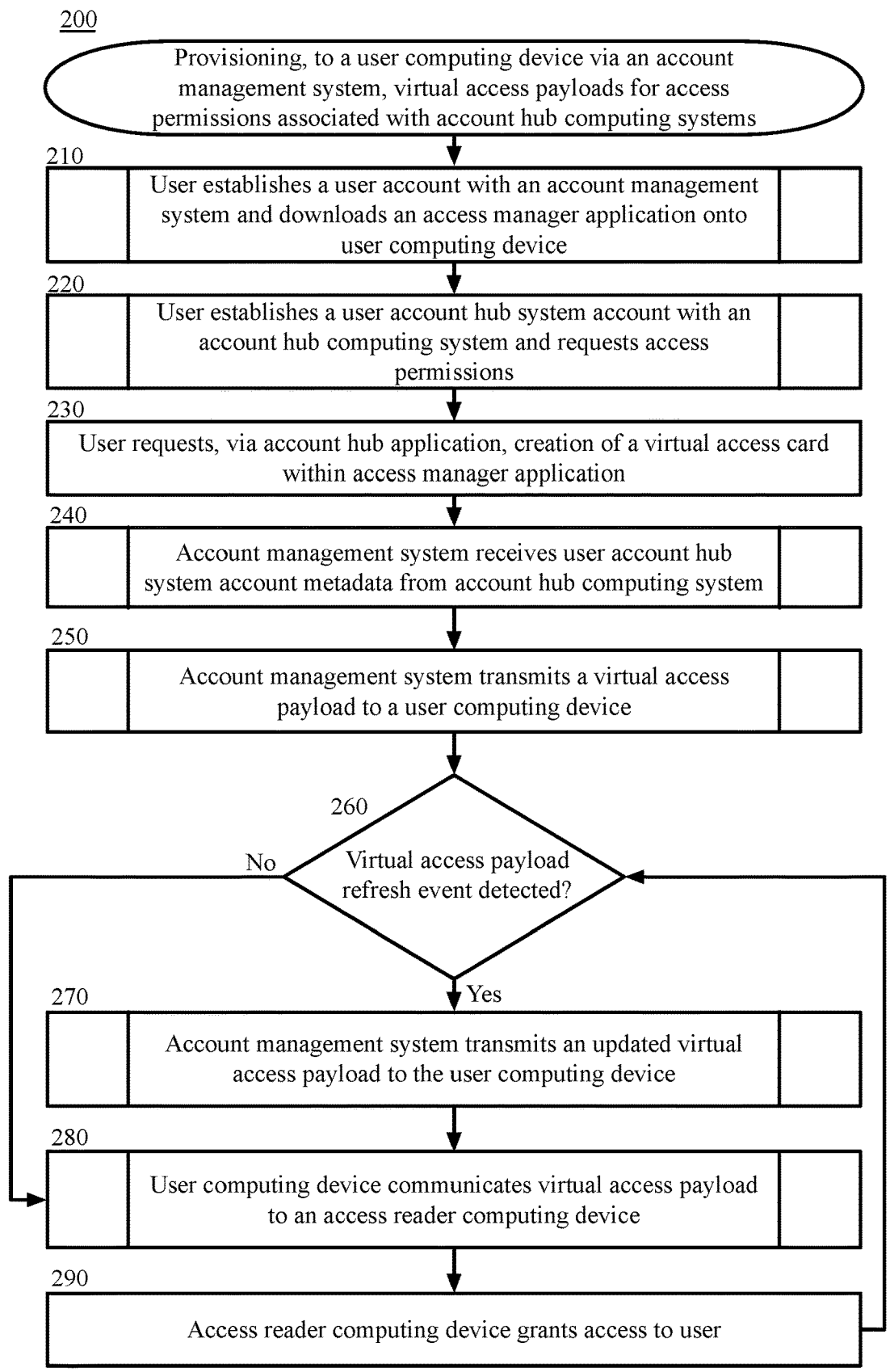
FIG. 2 is a block flow diagram depicting a method to provide, to a user computing device via an account management system, virtual access payloads for access permissions associated with account hub computing systems, in accordance with certain examples.

FIG. 2 is a block diagram depicting a method 200 for providing, to a user computing device 110 via an account management system 160, virtual access payloads for access permissions associated with account hub computing systems 140, in accordance with certain examples. The method 200 is described with reference to the components illustrated in FIG. 1. A user establishes an account with an account hub computing system 140 and establishes an account with an account management system 160. The user 101 requests creation of a virtual access card for the account hub computing system 140 using an account hub application 118 on the user computing device 110. The account management system 160 requests and receives an access card identifier and virtual access payload from the account hub computing system 140 in response to the user 101 requesting creation of the virtual access card and provides the access card identifier and the virtual access payload to the user computing device 110 for communication to an access reader computing device 130 via a wireless communication tap. In some examples, the account management system 160, in response to the access manager application 119 detecting a refresh event based on timestamp data, location data, or a user request, requests and receives an updated virtual access payload for the access card identifier from the account hub computing system 140 and provides the updated virtual access payload to the user computing device 110. To obtain access via the access reader computing device 130, the user 101 taps the user computing device 110 to the access reader computing device 130 to communicate the access card identifier and the virtual access payload to the access reader computing device 130, which provides access to the user 101 based on the validity of the access card identifier and the virtual access payload. Examples of providing access include opening a gate to a physical area, enabling user 101 use of the access reader computing device 130, enabling user 101 use of a device communicatively coupled to the access reader computing device 130, processing one or more service requests, providing data to the user computing device 110, or other appropriate process.

In block 210, the user 101 establishes a user account with the account management system 160 and downloads an access manager application 119 onto the user computing device 110. The method for establishing, by a user 101, a user 101 account with an account management system 160 and downloading an access manager application 119 onto a user computing device 110 is described in more detail hereinafter with respect to the method 210 described in FIG. 3.

Figure 3:
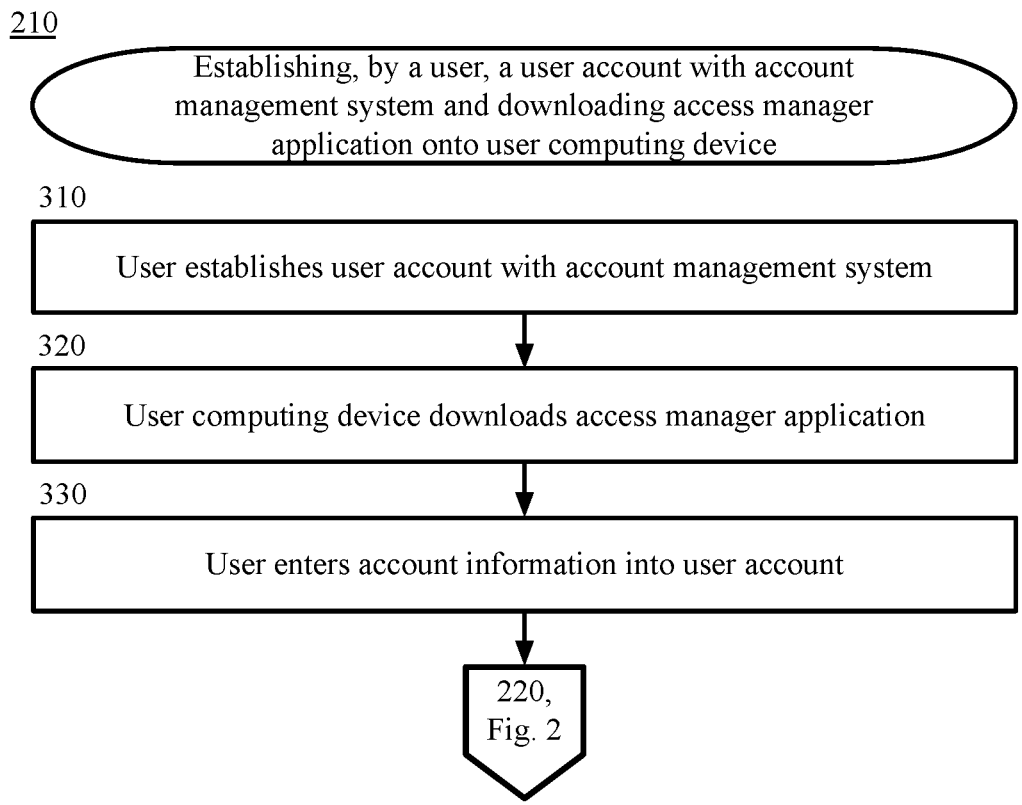
FIG. 3 is a block flow diagram depicting a method to establish, by a user, a user account with an account management system and to download an access manager application onto a user computing device, in accordance with certain examples.

FIG. 3 is a block flow diagram depicting a method 210 for establishing, by a user 101, a user 101 account with an account management system 160 and downloading an access manager application 119 onto a user computing device 110, in accordance with certain embodiments, as referenced in block 210. The method 210 is described with reference to the components illustrated in FIG. 1.

In block 310, the user 101 establishes a user account with the account management system 160. The user 101 accesses a website of the account management system 160 via a web browser of the user computing device 110. In an example, the user 101 enters the website address in the address bar of the web browser to access the website. In another example, the user 101 accesses the account management system 160 website using an application resident on the user computing device 110. The user 101 may select an application on the user computing device 110 that connects the user 101 to the account management system 160 website. The user 101 selects one or more objects on the user interface 111 to create a user account and registers a username and a password associated with the user account to use to sign in to the user account. In an example embodiment, the user account is associated with a service, such as a digital wallet, a transit pass account, an email service, a messaging service, a gaming service, a mapping service, or other appropriate service. In another example, the user account is associated with multiple services.

In block 320, the user computing device 110 downloads an access manager application 119. The access manager application 119 communicates with the account management system 160 over the network 120. In an example embodiment, the access manager application 119 is associated with the user account and may be utilized by the user 101 to access the user account and/or services provided by the account management system 160 for the user 101 associated with the user account. In an example, the access manager application 119 may be a digital wallet application to which the user 101 may upload financial data. In this example, the access manager application 119 communicates with the account management system 160, which administers the user 101 digital wallet account. In another example, the user 101 may download various applications associated with the user account from the account management system 160. In another example, the access manager application 119 is downloaded onto the user computing device 110 before the user 101 establishes the user account with the account management system 160. In other examples, the user 101 does not download the access manager application 119 onto the user computing device 110 and one or more actions described herein as being performed by the access manager application 119 may be performed by a web browser application or other application on the user computing device 110.

In block 330, the user 101 enters account information into the user account. The account information comprises one or more of a name of the user 101, an address of the user 101, a telephone number of the user 101, a birthdate of the user 101, or any other account information as the user 101 may provide. The account information comprises financial account information associated with one or more financial accounts of the user 101. The financial account information can be associated with a financial institution system, for example, a bank, an issuer system, a merchant system, with which the user 101 has a financial account, credit account, stored value account, or other account. Financial account information comprises one or more of an account number, a routing number, a credit card number, an expiration date, a card verification number, a name associated with the financial account, an address associated with the financial account and/or any other relevant, useful, or necessary information that the user 101 may enter into the user account or that the user account may require. In an example, the user 101 enters the financial account information using the access manager application 119. In another example, the user 101 enters the financial account information via a web browser, which communicates with the account management system 160.

From block 330, the method 210 proceeds to block 220 in FIG. 2.

Returning to FIG. 2, in block 220, the user 101 establishes a user account hub system account with an account hub computing system 140 and requests access permissions. The method for establishing, by a user 101, a user account hub system account with an account hub computing system 140 and requesting permissions is described in more detail hereinafter with respect to the method 220 described in FIG. 4. In certain other examples, the user 101 establishes a user account hub system account with an access agency computing system 170 and requests permissions in a similar manner.

Figure 4:
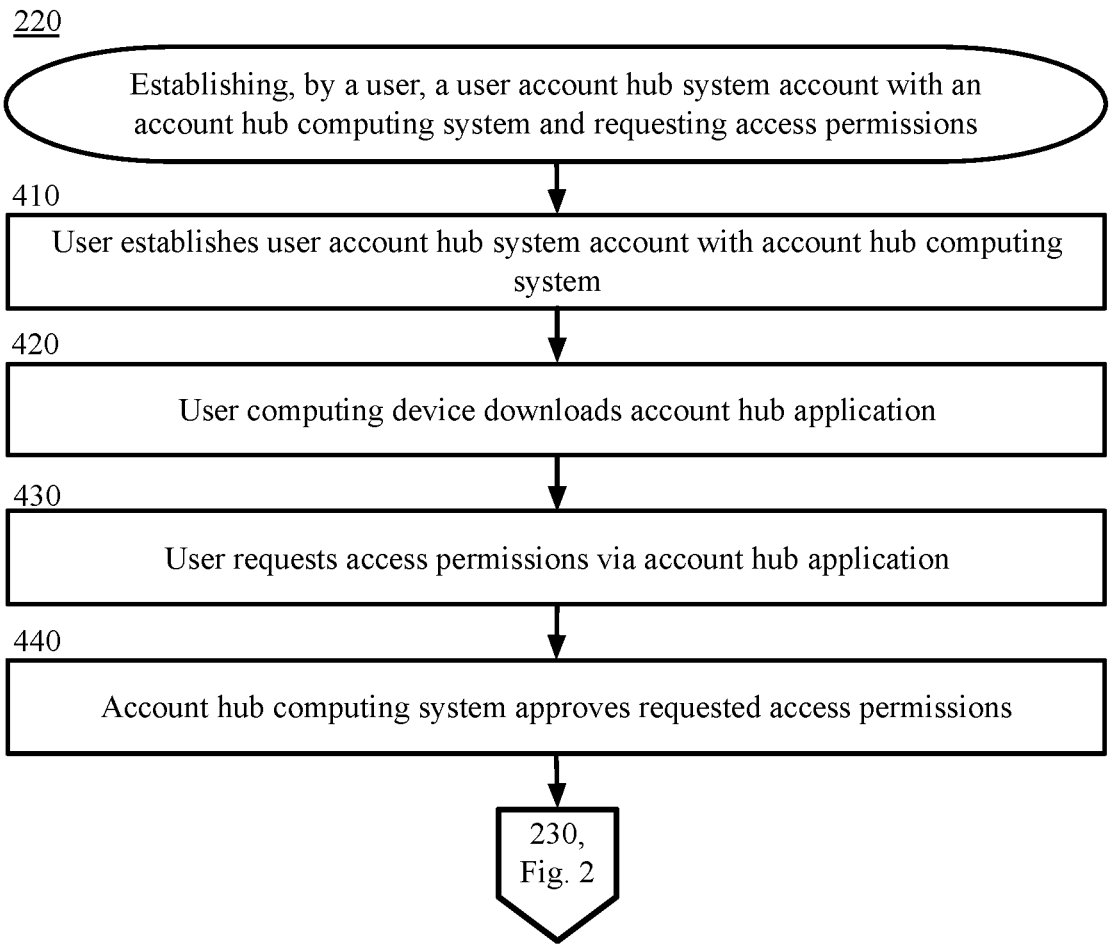
FIG. 4 is a block flow diagram depicting a method to establish, by a user, a user account hub system account with an account hub computing system and to request access permissions, in accordance with certain examples.

FIG. 4 is a block flow diagram depicting a method 220 for establishing, by a user 101, a user account hub system account with an account hub computing system 140 and requesting permissions, in accordance with certain embodiments, as referenced in block 220. The method 220 is described with reference to the components illustrated in FIG. 1.

An example account hub computing system 140 provides a wireless communication protocol, for example, an NFC protocol, for use by an access reader computing device 130 when communicating with user computing devices 110 to receive access card identifiers and virtual access payloads. A wireless communication protocol comprises a data format readable by the access reader computing device 130. The account hub computing system 140 provides services for one or more access agency systems 170, for example, the account hub computing system 140 provides access reader computing devices 130 and/or software for one or more access reader computing devices 130 for access agency systems 170. An access agency system 170 may comprise an entity that manages a toll booth device, a point of sale terminal, a device controlling entrance to a place of employment, or other access reader computing device 130 that controls access to one or more of a physical location, a good or service, a storage compartment, or data on a memory. One or more access agency systems 170 may contract with an account hub computing system 140 to provide an NFC protocol for use by access reader computing devices 130 associated with the one or more access agencies. The account hub computing system 140 may provide an NFC protocol for use on access reader computing devices 130 or software for use on access reader computing devices 130 at an access agency comprising one or more toll booths associated with a state government, city government, county government, other local government, or private entity. The account hub computing system 140 may provide an NFC protocol for use on access reader computing devices 130 or software for use on access reader computing devices 130 at one or more libraries, cafeterias, ticketing counters, or places of employment.

In block 410, the user 101 establishes the user account hub system account with the account hub computing system 140. The user 101 accesses a website of the account hub computing system 140. In an example, the user 101 accesses a website of the account hub computing system 140 via a web browser of the user computing device 110 by entering the website address in the address bar of the web browser to access the website. In another example, the user 101 accesses the account hub computing system 140 website using an application resident on the user computing device 110 by selecting an application on the user computing device 110 that connects the user 101 to the account hub computing system 140 website. The user 101 registers a username and a password associated with the user account hub system account to use to sign in to the user account.

The user 101 may establish a user account hub system account with an access agency computing system 170. The user 101 accesses a website of the access agency computing system 170. In an example, the user 101 accesses a website of the access agency computing system 170 via a web browser of the user computing device 110 by entering the website address in the address bar of the web browser to access the website. In another example, the user 101 accesses the access agency computing system 170 website using an application resident on the user computing device 110, for example, by selecting an application on the user computing device 110 that connects the user 101 to the access agency computing system 170 website. The user 101 registers, via the website, a username and a password associated with the user account hub system account to use to sign in to the user account.

In block 420, the user computing device 110 downloads the account hub application 118. In an example, the user computing device 110 downloads, via the network 120, the account hub application 118 from the account hub computing system 140 in response to the user 101 selecting one or more objects on the user interface 111 to request the download. In another example, the user computing device 110 downloads, via the network 120, the account hub application 118 from the account hub computing system 140 in response to the user 101 selecting one or more objects on the user interface 111 to request the download. The account hub application 118 resident on the user computing device 110 communicates with the account hub computing system 140 over the network 120. In an example embodiment, the account hub application 118 is associated with the user account hub system account and may be utilized by the user 101 to access the user account hub system account and/or services provided by the account hub computing system 140 or access agency computing system 170. The account hub application 118 may be an application that enables the user 101 to purchase, request, or otherwise obtain access permissions from an account hub computing system 140 or access agency computing system 170. Example access permissions comprise transit passes, transportation tickets, gate access permission, data access permission, or other access permission of the user 101 to a restricted physical area or to restricted data stored on a computing device.

In block 430, the user 101 requests access permissions via the account hub application 118. The user 101 selects one or more objects on the user interface 111 via the account hub application 118 to purchase, request, or otherwise obtain access permissions from an account hub computing system 140. In an example, the user 101 selects one or more objects on the user interface 111 to purchase an access permission using the account hub application 118 by selecting a transit pass for purchase, providing financial account information, and initiating a transaction to purchase the access permission. In another example, the user 101 uploads a code to the account hub application 118 associated with an access permission previously purchased or otherwise acquired from an access agency system 170 and the account hub application 118 logs the access permission or otherwise communicates via the network 120 with the access agency system 170 to receive access permission information associated with the purchased or otherwise acquired access permission. An example access permission comprises a ticket, a permission to enter a physical area, a transit pass, a transit ticket, a receipt to pick up a product previously purchased, a permission to borrow an object, a permission to access an object, a permission to access data from a memory, a permission to operate a device or machine, or other access permission.

In block 440, the account hub computing system 140 approves the requested access permissions. The account hub computing system 140 receives a request to purchase or otherwise request access permissions from the account hub application 118 via the network 120 in response to the user 101 selecting one or more objects on the user interface 111 to purchase or otherwise request the access permissions. In an example, the account hub computing system 140 approves requested access permissions in response to verifying successful payment by the user of an amount associated with the requested access permissions. In an example scenario, the user 101 previously purchased, via the account hub application 118, a transit pass valid for a year for unlimited travel with an access agency system 170 comprising a transit agency for $120 and the account hub computing system 140 approves the requested transit pass in response to receiving confirmation of payment of the amount to an account of the account hub computing system 140 or to an account of the transit agency. In another example, the account hub computing system 140 approves the requested access permission in response to verifying a credential of the user 101 that requested the access permission. In another example scenario, the user 101 requested, via the account hub application 118, an access permission for access to unlock an office door at an access agency system 170 comprising a place of employment and the account hub computing system 140 verifies that the user 101 is an employee of the place of employment and has valid credentials associated with access to the office door based on information received by the account hub computing system 140 from the access agency system 170.

An access permission may comprise one or more restrictions. The access permission may one or more temporal restrictions such as a one-time access, multiple accesses, unlimited access, access during a certain time period, or other temporal limitation. The access permission may comprise one or more geographic restrictions, for example, an access permission comprising a transit pass only grants access to transit services when the user computing device 110 is located within a geographic area comprising a city limit. The account hub computing system 140 or access agency system 170 may set other appropriate restrictions on the access permission, for example, an access permission comprising a transit pass is only valid for bus line A and not for bus line B, an access permission for employee access is only valid for area A in a place of employment and not for area B.

From block 440, the method 220 proceeds to block 230 in FIG. 2.

Returning to FIG. 2, in block 230, the user 101 requests, via the account hub application 118, creation of a virtual access card within the access manager application 119. The user 101 requests creation of the virtual access card by selecting one or more objects on the user interface 111 of the user computing device 110. The user 101 downloads one or more account hub applications 118, each account hub application 118 associated with a respective account hub computing system 140. The access manager application 119 is able to manage a user's 101 access permissions associated with one or more account hub computing systems 140. The user 101 may request, via an account hub application 118, to create a virtual access card within the access manager application 119 for the account hub computing system 140 associated with the account hub application 118. The virtual access card comprises an identifier associated with the user account hub system account associated with the user 101 and a virtual access payload communicated to the access reader computing device 130.

In response to the user 101 requesting, using the account hub application 118 to create a virtual card for the account hub computing system 140 via the access manager application 119, the access manager application 119 transmits, via the network 120 to the account management system 160, a notification of the user 101 request to create the virtual card. In an example, the account hub application 118 communicates the user account hub system account identifier and the request to the access manager application 119, which communicates the request via the network 120 to the account management system 160 along with the user account hub system account identifier. In another example, the account hub application 118 transmits, via the network 120 to the account management system 160, a notification of the user 101 request to create the virtual access card along with the user account hub system account identifier. The user 101 selects one or more objects on the user interface 111 of the user computing device 110 requesting, via the account hub application 118, to create the virtual access card and the account hub application 118 transmits, via the network 120 to the account management system 160, a notification of the user 101 request to create the virtual access card. In another example, access manager application 119 transmits, via the network 120 to the account management system 160, a notification of the user 101 request to create the virtual access card in response to the account hub application 118 receiving the user 101 request to create the virtual access card. The account management system 160 or the access manager application 119 instruct the account hub application 118 to display a user interface 111 object, selection of the user interface 111 object causing the access manager application 119 to open on the user computing device 110 and transmit the request to create the virtual access card to the account management system 160 via the network 120.

In certain examples described herein, in response to the user 101 requesting to create the virtual access card, the account management system 160 requests and receives user account hub system account metadata from the account hub computing system 140, saves, with user 101 permission, the account hub system account metadata in the user 101 account, and requests and receives a virtual access card identifier and access payload from the account hub computing system 140 to provide to the access manager application 119 on the user computing device 110. The purpose of the metadata is to provide the user 101 with information concerning the virtual access card associated with the account hub computing system 140.

In block 240, the account management system 160, receives user account hub system account metadata from the account hub computing system 140. The method for receiving, by an account management system 160, user account hub system account metadata is described in more detail hereinafter with respect to the method 230 described in FIG. 5. Account hub system account metadata comprises one or more access permission identifiers for all access permissions associated with the user account hub system account. An access permission may comprise a ticket, pass, or other access permission. Further, metadata particular to each access permission identifier associated with a user account hub system account may also be received from the account hub computing system 140.

Figure 5:
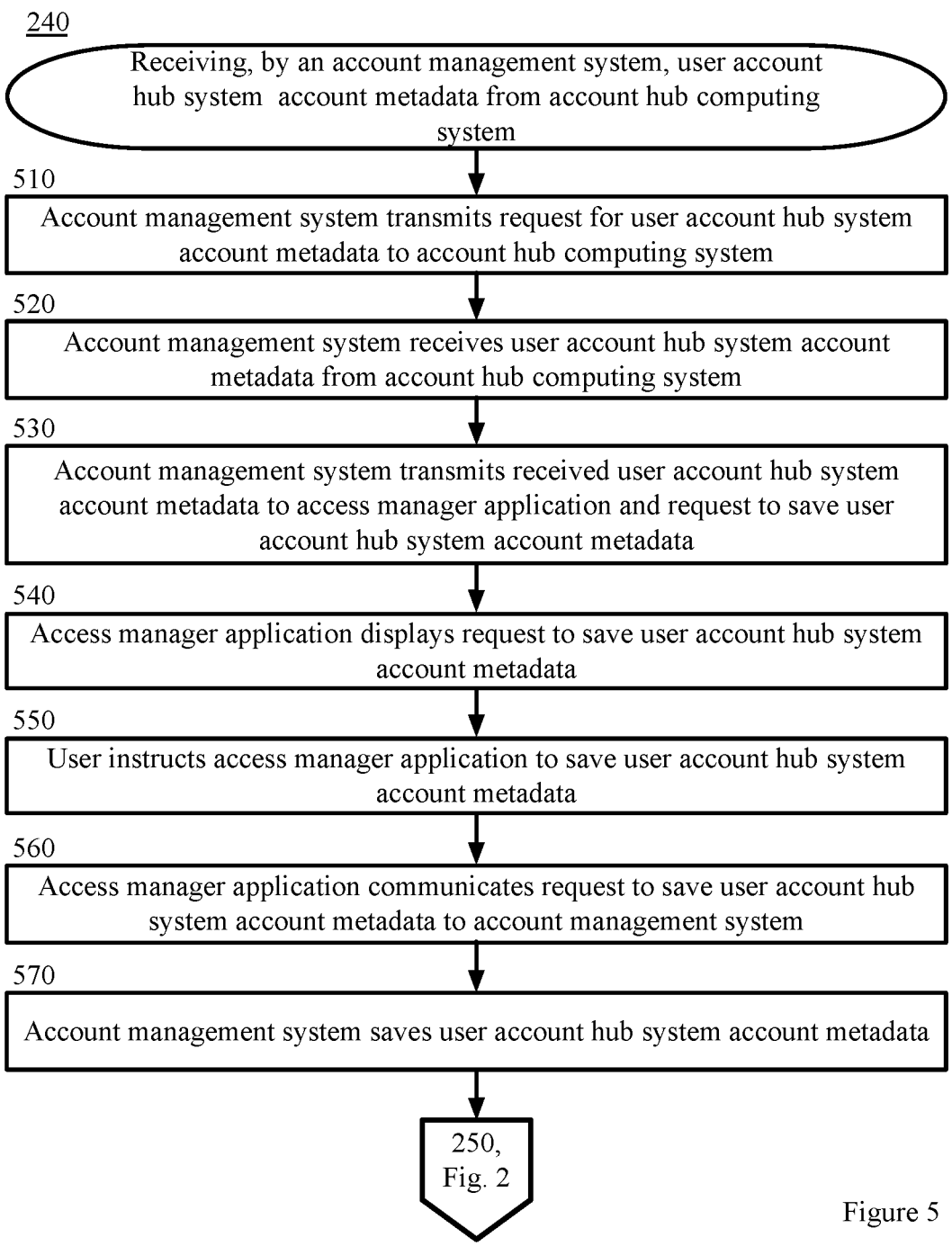
FIG. 5 is a block flow diagram depicting a method to receive, by an account management system, account hub system account metadata from an account hub computing system, in accordance with certain examples.

FIG. 5 is a block flow diagram depicting a method 240 for receiving, by an account management system 160, user account hub system account metadata, in accordance with certain embodiments, as referenced in block 240. The method 240 is described with reference to the components illustrated in FIG. 1.

In block 510, the account management system 160 transmits a request for user account hub system account metadata to the account hub computing system 140. In response to receiving the notification of the user 101 request to create the virtual access card from the access manager application 119 via the network 120, the account management system 160 transmits the request for the user account hub system account metadata to the account hub computing system 140. The account management system 160 transmits the request for user account hub system account metadata to the account hub computing system 140 via the network 120.

The account management system 160 receives the notification of the user 101 request to create the virtual access card from the access manager application 119 and identifies the account hub computing system 140 based on the received user account hub system account identifier. In this example, the account management system 160 communicates the user account hub system account identifier and a request for user account hub system account metadata to the account hub computing system 140 via the network 120. The account hub computing system 140 receives the user account hub system account identifier and the request for the user account hub system account metadata from the account management system 160 via the network 120. The account hub computing system 140 extracts the user account hub system account metadata corresponding to the user account hub system account identifier. The account hub computing system 140 extracts the user account hub system account metadata from a database or data storage unit 145 communicatively coupled to the account hub computing system 140. The account hub computing system 140 transmits the extracted user account hub system account metadata to the account management system 160 via the network 120 in response to receiving the request for user account hub system account metadata from the account management system 160.

Account hub system account metadata comprises one or more access permission identifiers for all access permissions associated with the user account hub system account. An access permission may comprise a ticket, pass, or other access permission. Other metadata may comprise transit agency system 170 names supported by the account hub computing system 140, card art images associated with access permission identifiers, a website URL for one or more access agency system 170 websites, a phone number, email address, or other contact information of one or more access agency systems 170. A card art image comprises an image that represents an access permission card that a user 101 may purchase to use infrastructure of the account hub computing system 140. Further, metadata particular to each access permission identifier associated with a user account hub system account may also be extracted from the user account hub system account. Access permission metadata comprises one or more of a type of access permission, purchase details, a link to a URL comprising terms, conditions, or other details concerning the access permission, a link to a URL comprising a privacy policy, a link to a refund website for the particular access permission, a concession category, a fare class, an access permission validity parameter, or other access permission metadata. Example access permission types comprise single-use, multiple-use, or other permission type. An example concession category comprises one or more of an adult category, a child category, a profession category, a student category, or other category. Example fare classes comprise business class, first class, standard class, or other class. Purchase details may comprise one or more a receipt number or other identifier for identifying a purchase transaction or other request for the access permission, a purchase/request date and time, cost data of the access permission, a method by which the access permission was purchased (for example, via a website, via an application, at a ticket counter), a URL to allow the repurchase of the access permission. The cost data may comprise one or more of a currency code, an integer value associated with a cost amount, and a percentage discount. The purpose of the metadata is to provide the user 101 with information concerning the virtual access card associated with the account hub computing system 140.

In block 520, the account management system 160 receives user account hub system account metadata from the account hub computing system 140. The account management system 160 requests and then receives the user account hub system account metadata from the account hub computing system 140 via the network 120 in response to receiving the notification of the request to create a virtual access card for the user account hub system account from the access manager application 119. The account management system 160 associates the received user account hub system account metadata with the user 101 account and saves the received user account hub system account metadata in a data storage unit 165 of the account management system 160.

In block 530, the account management system 160 transmits the received user account hub system account metadata to the access manager application 119 and a request to save the user account hub system account metadata. The account management system 160 communicates with the access manager application 119 via the network 120 and transmits the received user account hub system account metadata and the user account hub system account identifier to the access manager application 119 and the request to save the user account hub system account metadata. The access manager application 119 receives the account hub system account metadata from the account management system 160 via the network 120. In examples where the account management system 160 receives account hub system account metadata associated with multiple user account hub system accounts, the account management system 160 transmits a user account hub system account identifier associated with the corresponding user account hub system account metadata to the access manager application 119 via the network 120. The access manager application 119 receives the user account hub system account metadata and the user account hub system account identifier.

In block 540, the access manager application 119 displays the request to save the user account hub system account metadata. The access manager application 119 displays the request to save the user account hub system account metadata via the user interface 111 along with a user interface 111 object selectable by the user 101 to approve the request and another user interface 111 object selectable by the user 101 to deny the request. The displayed request reads "do you wish to save a virtual access card for this account hub computing system to your user account?"

In block 550, the user 101 instructs the access manager application 119 to save the user account hub system account metadata. The user 101 can select a user interface 111 object to approve the displayed request for the account management system 160 to save the user account hub system account metadata. The user 101 can select a user interface 111 object to decline the displayed request for the account management system 160 to save the user account hub system account metadata. The purpose of the metadata is to provide the user 101 with information concerning the virtual access card associated with the account hub computing system 140. The user 101 may view details about the virtual access card, for example, an account hub computing system 140 identifier, an access agency system 170 identity, information concerning access permissions of the user 101, or other information from the metadata concerning the virtual access card or the user's account hub system account.

In block 560, the access manager application 119 communicates the request to save the user account hub system account metadata to the account management system 160. In response to receiving the selection of the user interface 111 object to approve the displayed request, the access manager application 119 communicates a request to save the user account hub system account metadata to the account management system 160 via the network 120. In response to receiving the selection of the user interface 111 object to decline the displayed request, the access manager application 119 communicates a request not to save the user account hub system account metadata to the account management system 160 via the network 120.

In block 570, the account management system 160 saves the user account hub system account metadata. In response to receiving the request to save the user account hub system account metadata from the access manager application 119, the account management system 160 associates the user account hub system account metadata with the user account hub system account identifier and stores the user account hub system account metadata in the user 101 account in the data storage device 165. In response to receiving the request not to save the user account hub system account metadata from the access manager application 119, the account management system 160 deletes the user account hub system account metadata received from the account hub computing system 140.

In some examples, the account management system 160 periodically requests user account hub system account metadata from the account hub computing system 140, receives subsequent user account hub system account metadata, and saves the subsequently received user account hub system account metadata in the user 101 account using the data storage unit 165. Subsequent user account hub system account metadata may be different from previously received user account hub system account metadata as the user 101 acquires new access permissions, removes access permissions, or otherwise modifies existing access permissions with the account hub computing system 140. In some examples, the account management system 160 periodically requests and receives user account hub system account metadata associated with each of multiple user account hub system accounts associated with the user 101 account, the user account hub system account metadata for each user account hub system account received from a respective account hub computing system 140. For example, the user 101 account receives metadata from account hub computing system 140 A that provides an NFC protocol for access agency system 170 A and access agency system 170 B and from account hub computing system 140 B that provides an NFC protocol for access agency system 170 C.

From block 570, the method 240 proceeds to block 250 in FIG. 2.

Returning to FIG. 2, in block 250, the account management system 160 transmits a virtual access payload to the user computing device 110. The method for transmitting, by an account management system 160, a virtual access payload to a user computing device 110 is described in more detail hereinafter with respect to the method 250 described in FIG. 6. The virtual access payload comprises a digital representation of a virtual access card on a user computing device 110. In certain examples, the virtual access payload comprises the access card identifier. In certain examples, the virtual access payload comprises a verification code known to the account hub computing system 140. In certain examples, the virtual access payload comprises a timestamp indicating a time at which the account hub computing system 140 generated the virtual access payload.

Figure 6:
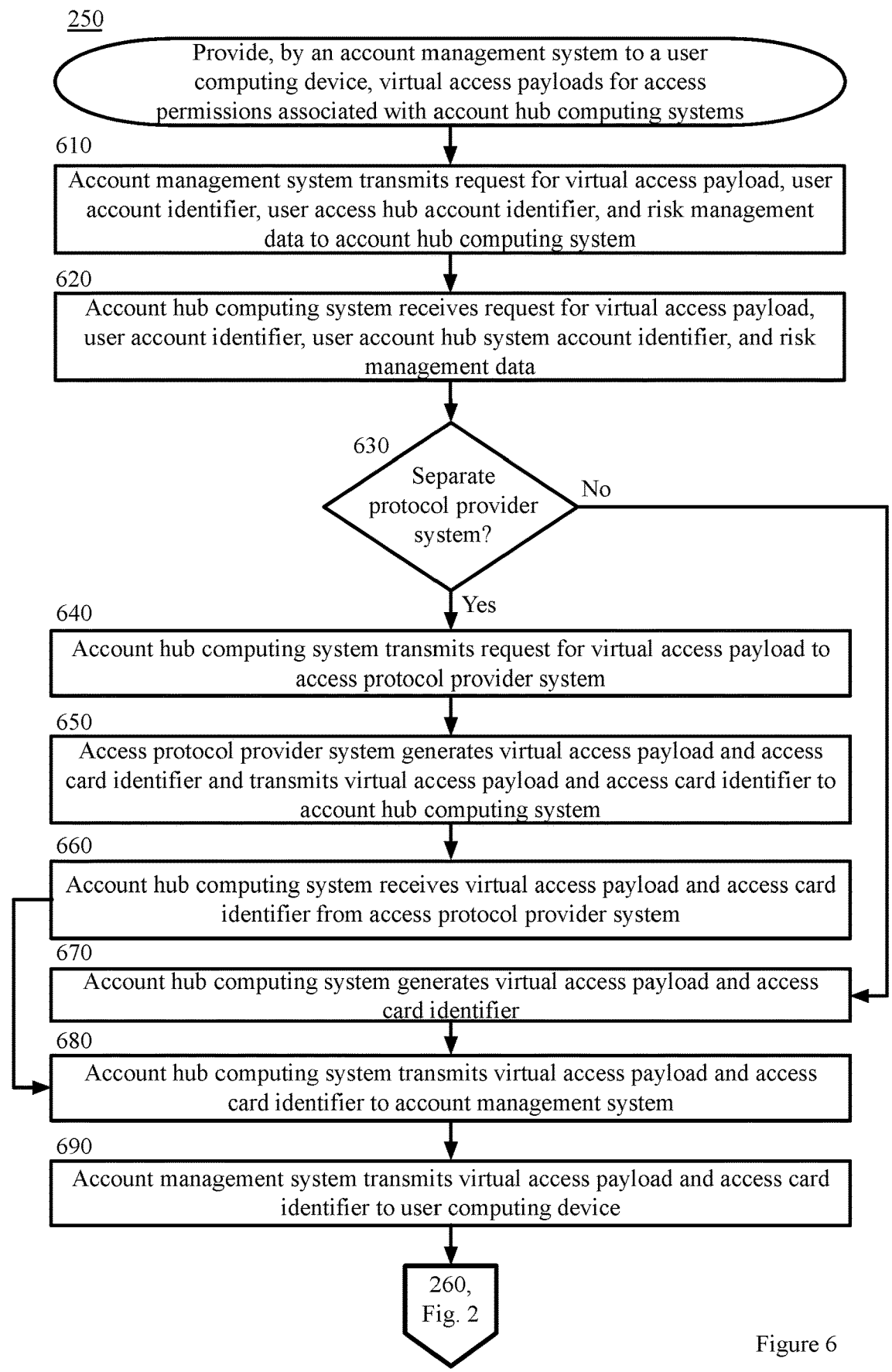
FIG. 6 is a block flow diagram depicting a method to transmit, by an account management system, a virtual access payload to a user computing device, in accordance with certain examples.

FIG. 6 is a block flow diagram depicting a method 250 for transmitting, by an account management system 160, a virtual access payload to a user computing device 110, as referenced in block 250. The method 250 is described with reference to the components illustrated in FIG. 1.

In block 610, the account management system 160 transmits a request for a virtual access payload, a user 101 account identifier, a user 101 account hub system account identifier, and risk management data to the account hub computing system 140. The account management system 160 may provide, to the account hub computing system 140, the user account hub system account identifier that was received from the account hub application 118 in the request to create a virtual access card. The account management system 160 also provides the user 101 account identifier and risk management data. Example risk management data may include a current location of the user computing device 110 and/or a location data history of the user computing device 110 if user has configured user 101 account settings to enable the account management system 160 to receive location data of the user computing device 110. Example risk management data may also comprise a transaction history describing recent user transactions conducted within a certain period of time and access permission request history. Risk management data may comprise a virtual card provisioning history describing recent virtual access card provisioning events and a times at which each virtual access card was provisioned to the user computing device 110. The risk management data is used by the account hub computing system 140 to determine whether to trust the user computing device 110 or user 101 associated with the user computing device 110 to receive a virtual access card. In other examples, the account management system 160 does not transmit risk management data to the account hub computing system 140.

In block 620, the account hub computing system 140 receives the request for a virtual access payload, the user account identifier, the user account hub system account identifier, and the risk management data. The account hub computing system 140 identifies the user account hub system account based on the received user account hub system account identifier. The account hub computing system 140 may extract user account hub system account information and determine whether to process the request for the virtual access payload or to decline the request for the virtual access payload based on the received risk management data and the user account hub system account information. The account hub computing system 140 determines to process or decline the request based on risk management data comprising received location data of the user computing device 110. The received location data may comprise a location history of the user computing device 110 comprising one or more locations logged by the user computing device 110 with corresponding timestamps indicating times at which the one or more locations were logged. The account hub computing system 140 determines to process the request in response to determining that the location of the user computing device 110 at a time that the user computing device 110 requested creation of a virtual access card is greater than a threshold distance from an address associated with the user account hub system account. The account hub computing system 140 determines not to process the request in response to determining that the location of the user computing device 110 at the time that the user computing device 110 requested creation of a virtual access card is less than or equal to the threshold distance from an address associated with the user account hub system account. Risk management data may also comprise a transaction history describing recent user transactions conducted within a certain period of time and access permission request history. The account hub computing system 140 may apply one or more models to the transaction history to determine whether the transaction history indicates a likelihood of fraudulent activity in association with the request for the virtual access card. The account hub computing system 140 determines a risk score for the user 101 based on the received risk management data. The account hub computing system 140 determines to process the request in response to determining that the risk score is greater than a threshold risk score. The account hub computing system 140 determines not to process the request in response to determining that the risk score is less than or equal to the threshold risk score. The account hub computing system 140 may determine to process or decline the request based on risk management data comprising a virtual card provisioning history describing recent virtual access card provisioning events and a times at which each virtual access card was provisioned to the user computing device 110. The account hub computing system 140 determines to process the request in response to determining that the user computing device 110 has not requested provisioning of greater than a threshold number of virtual access cards within a predefined period of time prior to a current time. The account hub computing system 140 determines to decline the request in response to determining that the user computing device 110 has requested provisioning of greater than a threshold number of virtual access cards within a predefined period of time prior to a current time. The threshold number comprises three, five, ten, or another appropriate threshold number and the predefined period of time comprises twenty-four hours or other appropriate period of time.

If the account hub computing system 140 determines not to process the request for a virtual access payload, the account hub computing system 140 transmits a notification to the account management system 160 via the network that the request for the virtual access payload cannot be processed and the account management system 160 notifies the user 101 by sending an error message to the user computing device 110 via the network 120 for display that notifies the user 101 that the virtual access payload cannot be generated. In this example, in response to viewing the error message displayed by the user computing device 110, the user 101 contacts the account hub computing system 140 to request more information concerning the user account hub system account.

In block 630, the account hub computing system 140 either comprises an access protocol provider system 150 or does not comprise an access protocol provider system 150. In certain examples, the account hub computing system 140 provides an NFC protocol for use by an access reader computing device 130 when communicating with the user computing device 110 and generates virtual access payloads according to the NFC protocol. However, in other examples, the access protocol provider system 150 provides the NFC protocol and communicates with the account hub computing system 140 to provide virtual access payloads for use by user computing devices 110 to request access at access reader computing devices 130. As previously discussed, the account hub computing system 140 provides services for one or more access agency systems 170, for example, the account hub computing system 140 provides access reader computing devices 130 and/or software for one or more access reader computing devices 130 for access agency systems 170.

If the account hub computing system 140 comprises the access protocol provider system 150, the method 250 proceeds to block 670. The account hub computing system 140 may perform one or more functions associated with an access protocol provider system 150.

In block 670, the account hub computing system 140 generates a virtual access payload and an access card identifier. The account hub computing system 140 generates a virtual access payload and an access card identifier for the user account hub system account. The access card identifier comprises one or more alphanumeric and/or symbolic characters. The account hub computing system 140 generates access card identifiers using a random number generator. The virtual access payload comprises a digital representation of a virtual access card for use by the user computing device 110. The account hub computing system 140 associates the generated access card identifier and the generated virtual access payload with the user account hub system account identifier. In an example, the virtual access payload comprises a cryptographic key used to establish secure communication between the access reader computing device 130 and the user computing device 110. In this example, the account hub computing system 140 transmits the cryptographic key to the access reader computing device 130 via the network 120. In another example, the virtual access payload comprises a key that is verified by the access reader computing device 130. In this example, the account hub computing system 140 transmits a notification to the access reader computing device via the network 120 comprising the key and the associated access card identifier so that the access reader computing device can verify the key when the user computing device 110 transmits the virtual access payload and the access card identifier to the access reader computing device via a wireless communication channel. In an example, the virtual access payload is formatted by the access hub computing system 140 so that the virtual access payload is intelligible or otherwise readable by the access reader computing device 130 and so that the virtual access payload is formatted to correspond to a wireless communication protocol used by the access reader computing device 130.

In block 680, the account hub computing system 140 transmits the generated virtual access payload and access card identifier to the account management system 160. The account hub computing system 140 transmits the generated virtual access payload and access card identifier to the account management system 160 via the network 120 in response to the request for the virtual access payload. The account management system 160 receives the virtual access payload and the access card identifier from the account hub computing system 140 via the network 120 in response to sending the request for the virtual access payload. The account management system 160 saves the received access card identifier and received virtual access payload to the user 101 account. The account management system 160 associates the virtual access payload and the access card identifier with the user 101 account identifier and the user account hub system account identifier.

In block 690, the account management system 160 transmits the virtual access payload and the access card identifier to the user computing device 110. The account management system 160 transmits the virtual access payload and the access card identifier to the user computing device 110 via the network 120 in response to the previous request to create the virtual access card received from the user computing device 110. The access manager application 119 on the user computing device 110 receives the virtual access payload and the access card identifier via the network 120 from the account management system 160. The user computing device 110 stores the received virtual access payload and the received access card identifier in the data storage unit 113. The access manager application 119 associates the virtual access payload and the access card identifier with the user account hub system account identifier.

From block 690, the method 250 proceeds to block 260 in FIG. 2.

Returning to block 630, if the account hub computing system 140 does not comprise the access protocol provider system 150, the method 250 proceeds to block 640. In this example, the account hub computing system 140 communicates with the access protocol provider system 150 to receive a virtual access payload.

In block 640, the account hub computing system 140 transmits a request for a virtual access payload to the access protocol provider system 150. The account hub computing system 140 transmits the request for the virtual access payload to the access protocol provider system 150 via the network 120. The account hub computing system 140 transmits the access permission data associated with the user account hub system account to the access protocol provider system 150 via the network 120. The access protocol provider system 150 receives the request for the virtual access payload from the access protocol provider system 150 via the network 120.

In block 650, the access protocol provider system 150 generates the virtual access payload and the access card identifier and transmits the virtual access payload and the access card identifier to the account hub computing system 140. The access protocol provider system 150 generates an access card identifier comprising one or more alphanumeric and/or symbolic characters. The access protocol provider system 150 generates the virtual access payload based on the received access permission data associated with the user account hub system account. The access protocol provider system 150 associates the virtual access payload with the access card identifier. The access protocol provider system 150 stores the virtual access payload and the access card identifier in the data storage unit 155 of the access protocol provider system 150. The virtual access payload comprises a cryptographic key used to establish secure communication between the access reader computing device 130 and the user computing device 110. In this example, the access protocol provider system 150 transmits the cryptographic key to the access reader computing device 130 via the network 120. The access protocol provider system 150 transmits, via the network 120, the access card identifier and the virtual access payload to the account management system 160 via the network 120. In another example, the virtual access payload comprises a key that is verified by the access reader computing device 130. In this example, the account hub computing system 140 transmits a notification to the access reader computing device via the network 120 comprising the key and the associated access card identifier so that the access reader computing device can verify the key when the user computing device 110 transmits the virtual access payload and the access card identifier to the access reader computing device via a wireless communication channel. In an example, the virtual access payload is formatted by the access protocol provider system 150 so that the virtual access payload is intelligible or otherwise readable by the access reader computing device 130 and so that the virtual access payload is formatted to correspond to a wireless communication protocol used by the access reader computing device 130.

In block 660, the account hub computing system 140 receives the virtual access payload and the access card identifier from the access protocol provider system 150. The account hub computing system 140 receives, via the network 120 from the access protocol provider system 150, the virtual access payload and the access card identifier generated by the access protocol provider system 150 in response to transmitting the request for a virtual access payload for the user 101 account. The account hub computing system 140 stores the received access card identifier and the received virtual access payload in the data storage unit 145 of the account hub computing system 140. The account hub computing system 140 associates, in the user 101 account, the virtual access payload with the access card identifier, and the user account hub system account identifier.

From block 660, the method 250 proceeds to block 680.

In block 680, the account hub computing system 140 transmits the virtual access payload and the access card identifier to the account management system 160. The account hub computing system 140 transmits the virtual access payload and access card identifier to the account management system 160 via the network 120 in response to the request for the virtual access payload. The account management system 160 receives the virtual access payload and the access card identifier from the account hub computing system 140 via the network 120 in response to sending the request for the virtual access payload. The account management system 160 saves the received access card identifier and received virtual access payload to the user 101 account. The account management system 160 associates the virtual access payload and the access card identifier with the user 101 account identifier and the user account hub system account identifier. The received virtual access payload and access card identifier are associated with the user's account hub system account with the account hub computing system 140. In certain examples, the user 101 account comprises multiple virtual access payloads, each virtual access payload associated with a respective access card identifier, each access card identifier associated with a respective user account hub system account with a respective account hub computing system 140.

In block 690, the account management system 160 transmits the virtual access payload and the access card identifier to the user computing device 110. The account management system 160 transmits the virtual access payload and the access card identifier to the user computing device 110 via the network 120 in response to the previous request to create the virtual access card received from the user computing device 110. The access manager application 119 on the user computing device 110 receives the virtual access payload and the access card identifier via the network 120 from the account management system 160. The user computing device 110 stores the received virtual access payload and the received access card identifier in the data storage unit 113. The access manager application 119 associates the virtual access payload and the access card identifier with the user account hub system account identifier.

From block 690, the method 250 proceeds to block 260 in FIG. 2.

Returning to FIG. 2, in block 260, the access manager application 119 determines whether a virtual access payload refresh event is detected. The refresh event may comprise a passage of a threshold amount of time since the virtual access payload was generated. The refresh event may comprise an indication that the user computing device 110 is greater than a threshold length from an address associated with the user 101 account based on location data of the user computing device 110. The refresh event may comprise a request for a refresh event initiated by the user 101 by selecting one or more objects on the user interface 111 to instruct the access manager application 119 to provide an updated virtual access payload. In other examples, the account management system 160, instead of the access manager application 119, determines whether a virtual access payload refresh event is detected. In other examples, the account management system 160 receives a request for a refresh event from the account hub computing system 140 via the network 120, for example, when the account hub computing system 140 and/or the access protocol provider system 150 changes the cryptographic key used in the virtual access payload.

If the access manager application 119 determines that a virtual access payload refresh event has not been detected, the method 200 proceeds to block 280, and the user computing device 110 communicates the virtual access payload to an access reader computing device 130. After receiving the virtual access payload on the user computing device 110, the virtual access payload is ready for communication by the user computing device 110 to an access reader computing device 130 until a refresh event is detected by the access manager application 119. The user 101 selects the access manager application 119, approaches the access reader computing device 130, and taps the user computing device 110 to the access reader computing device 130 to communicate the virtual access payload to the access reader computing device 130. The method for communicating, by a user computing device 110, a virtual access payload to an access reader computing device 130 is described in more detail hereinafter with respect to the method 280 described in FIG. 8.

Returning to block 260, if the access manager application 119 determines that a virtual access payload refresh event has been detected, the method 200 proceeds to block 270. The access manager application 119 determines a refresh event comprising a threshold period of time having passed since the virtual access payload was generated. The virtual access payload comprises a timestamp indicating a time when the virtual access payload was generated. In this example, the access manager application 119 compares the timestamp against a current time determined by the user computing device 110. In this example, the threshold period of time may comprise 10 days, 3 days, 1 day, 4 hours, or other appropriate threshold period of time. In an example, the account management system 160 configures the threshold period of time and configuring a lower threshold period of time may increase security of the virtual access payload but also increase bandwidth usage, whereas configuring a higher threshold period of time may decrease security of the virtual access payload but also decrease bandwidth usage. In another example, the access manager application 119 logs location data of the user computing device 110 indicating a current location of the user computing device 110 and determines a refresh event comprising the current location being greater than a threshold distance from a home location associated with the user 101 account. The home location may comprise a location associated with an address associated with the user 101 account. The threshold distance is 500 miles, 200 miles, 15 miles or another appropriate threshold distance. The account management system 160 configures the threshold distance and configuring a lower threshold distance may increase security of the virtual access payload but also increase bandwidth usage, whereas configuring a higher threshold distance may decrease security of the virtual access payload but also decrease bandwidth usage. Refreshing the virtual access payload may decrease a likelihood of an illegitimate computing device using the virtual access payload.

In block 270, the account management system 160 transmits an updated virtual access payload to the user computing device 110. The method for transmitting, by an account management system 160, an updated virtual access payload to a user computing device 110 is described in more detail hereinafter with respect to the method 270 described in FIG. 7.

Figure 7:
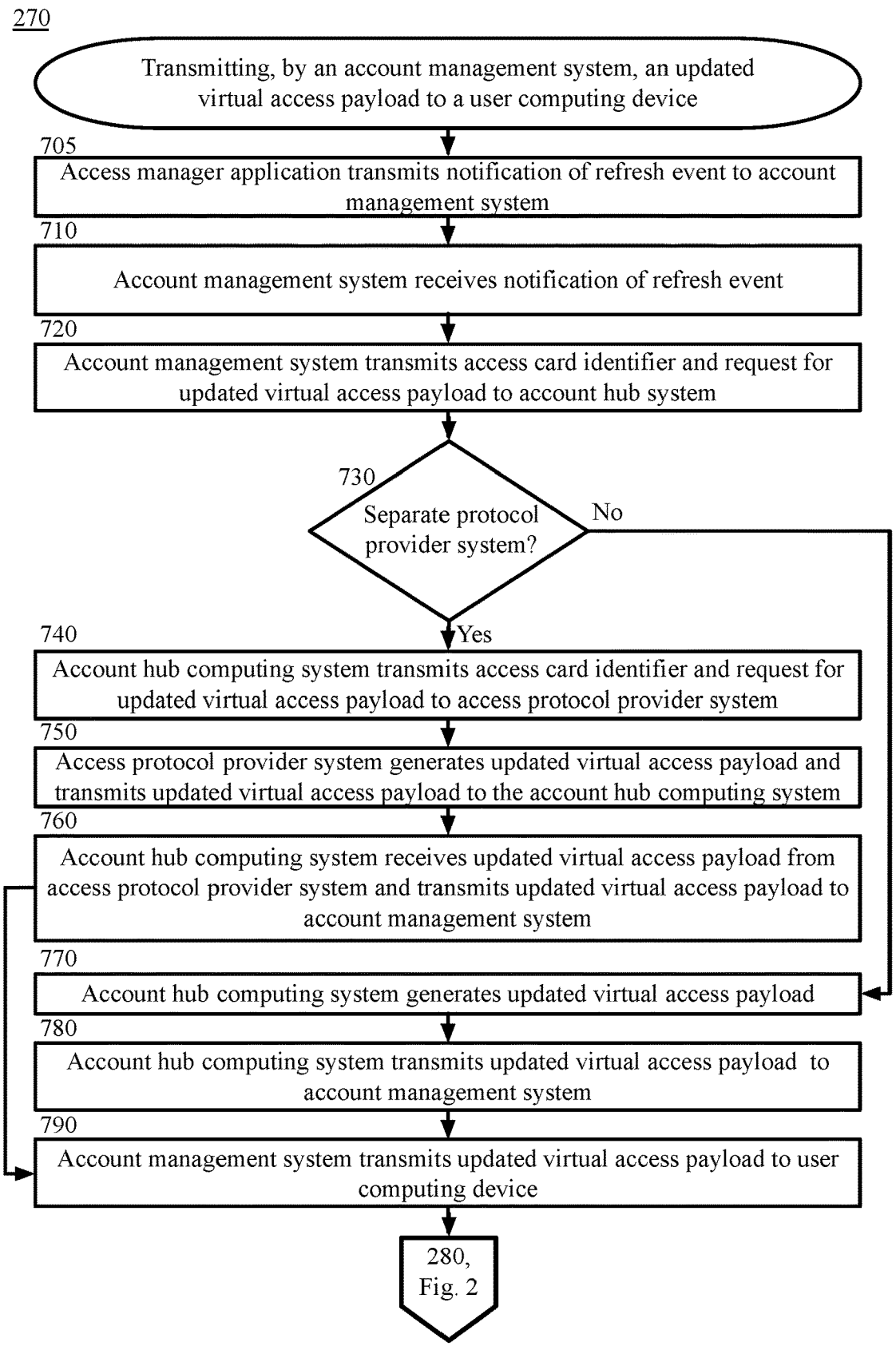
FIG. 7 is a block flow diagram depicting a method to transmit, by an account management system, an updated virtual access payload to a user computing device, in accordance with certain examples.

FIG. 7 is a block flow diagram depicting a method 270 for transmitting, by an account management system 160, an updated virtual access payload to a user computing device 110, as referenced in block 270. The method 270 is described with reference to the components illustrated in FIG. 1.

In block 705, the access manager application 119 transmits a notification of a refresh event to the account management system 160. In response to detecting or otherwise determining the refresh event, the access manager application 119 transmits, via the network 120, the notification of a refresh event to the account management system 160. In response to determining that a current location of the user computing device 110 is greater than a threshold distance from a home location associated with the user 101 account, the access manager application 119 transmits the notification of a refresh event to the account management system 160. In another example, in response to determining that a threshold period of time since the virtual access payload was generated has passed based on comparing a current time to a timestamp logged in the virtual access payload, the access manager application 119 transmits the notification of a refresh event to the account management system 160. The notification of the refresh event comprises an explanation of the refresh event, for example, "virtual access payload expired," "user computing device outside of usual location," or other appropriate explanation of the refresh event. The access manager application 119 transmits, to the account management system 160 via the network 120, the user 101 account identifier associated with the user 101 account managed by the account management system 160, the user account hub system account identifier associated with the virtual access payload for which the refresh event was determined, and the access card identifier associated with the virtual access payload along with the notification of the refresh event.

In block 710, the account management system 160 receives the notification of the refresh event. The account management system 160 receives the notification of the refresh event from the access manager application 119 via the network 120. The account management system 160 associates the refresh event with the user 101 account identifier, the user account hub system account identifier, and the access card identifier and logs the received notification of the refresh event in the data storage unit 165. The account management system 160 receives the user 101 account identifier, the user account hub system account identifier, and the access card identifier in the notification of the refresh event. The account management system 160 logs a timestamp comprising a time at which the account management system 160 received the notification of the refresh event. The account management system 160 may log an explanation for the refresh event received in the notification of the refresh event, for example, "virtual access payload expired," "user computing device outside of usual location," or other appropriate explanation of the refresh event. The account management system 160 may receive a request for a refresh event from the account hub computing system 140. The account hub computing system 140 may periodically request for one or more virtual access payloads to be refreshed, for example, when the account hub computing system 140 and/or the access protocol provider system 150 changes the cryptographic key in the virtual access payload to a subsequent cryptographic key different from the cryptographic key.

In block 720, the account management system 160 transmits the access card identifier and a request for an updated virtual access payload to the account hub computing system 140. The account management system 160 provides, to the account hub computing system 140 via the network 120, the user account hub system account identifier and access card identifier associated with the virtual access payload. The account hub computing system 140 receives, via the network 120, the access card identifier and the request for the updated virtual access payload. The account hub computing system 140 identifies the user account hub system account based on the received access card identifier.

In block 730, the account hub computing system 140 either comprises or does not comprise an access protocol provider system 150. In certain examples, the account hub computing system 140 provides an NFC protocol for use by an access reader computing device 130 when communicating with the user computing device 110 and generates virtual access payloads according to the NFC protocol. However, in other examples, the access protocol provider system 150 provides the NFC protocol and communicates with the account hub computing system 140 to provide virtual access payloads for use by user computing devices 110 to request access at access reader computing devices 130. As previously discussed, the account hub computing system 140 provides services for one or more access agency systems 170, for example, the account hub computing system 140 provides access reader computing devices 130 and/or software for one or more access reader computing devices 130 for access agency systems 170.

If the account hub computing system 140 comprises the access protocol provider system 150, the method 270 proceeds to block 770. The account hub computing system 140 may perform one or more functions associated with an access protocol provider system 150.

In block 770, the account hub computing system 140 generates an updated virtual access payload. The account hub computing system 140 generates an updated or subsequent virtual access payload and associates the updated virtual access payload with the access card identifier for the user account hub system account. The account hub computing system 140 associates the access card identifier and the subsequent virtual access payload with the user account hub system account identifier. The account hub computing system 140 stores the updated virtual access payload in the data storage unit 145. The updated virtual access payload comprises a subsequent cryptographic key different from the cryptographic key in the previous virtual access payload associated with the access card identifier. The subsequent cryptographic key is used to establish secure communication between the access reader computing device 130 and the user computing device 110. In this example, the account hub computing system 140 transmits the subsequent cryptographic key to the access reader computing device 130 via the network 120. In another example, the updated virtual access payload comprises a second key that is verified by the access reader computing device 130, the second key being different from a first key associated with a previously generated virtual access payload. In this example, the account hub computing system 140 transmits a notification to the access reader computing device via the network 120 comprising the second key and the associated access card identifier so that the access reader computing device can verify the second key when the user computing device 110 transmits the virtual access payload and the access card identifier to the access reader computing device via a wireless communication channel. In this example, if the user computing device 110 transmits the first key instead of the second key to the access reader computing device, the access reader computing device is unable to verify the virtual access payload. In an example, the updated virtual access payload is formatted by the access hub computing system 140 so that it is intelligible or otherwise readable by the access reader computing device 130 and so that the updated virtual access payload is formatted to correspond to a wireless communication protocol used by the access reader computing device 130.

In block 780, the account hub computing system 140 transmits the updated virtual access payload to the account management system 160. The account hub computing system 140 transmits the updated virtual access payload to the account management system 160 via the network 120 in response to the request for the updated virtual access payload. The account management system 160 receives the updated virtual access payload from the account hub computing system 140 via the network 120 in response to sending the request for the updated virtual access payload. The account management system 160 saves the updated access payload to the user 101 account. The account management system 160 associates the updated virtual access payload and the access card identifier with the user 101 account identifier and the user account hub system account identifier. The account management system 160 stores the updated virtual access payload in the data storage unit 165.

In block 790, the account management system 160 transmits the updated virtual access payload to the user computing device 110. The account management system 160 transmits the updated virtual access payload to the user computing device 110 via the network 120 in response to the notification of the refresh event received from the user computing device 110. The access manager application 119 on the user computing device 110 receives the updated virtual access payload via the network 120 from the account management system 160. The user computing device 110 stores the updated virtual access payload and the access card identifier in the data storage unit 113. The access manager application 119 associates the updated virtual access payload and the access card identifier with the user account hub system account identifier.

From block 790, the method 270 proceeds to block 280 in FIG. 2.

Returning to block 730, if the account hub computing system 140 does not comprise the access protocol provider system 150, the method 270 proceeds to block 740. In this example, the account hub computing system 140 communicates with the access protocol provider system 150 to receive an updated virtual access payload.

In block 740, the account hub computing system 140 transmits the access card identifier and a request for an updated virtual access payload to the access protocol provider system 150. The account hub computing system 140 transmits the request for the updated virtual access payload to the access protocol provider system 150 via the network 120. The account hub computing system 140 transmits the access permission data associated with the user account hub system account to the access protocol provider system 150 via the network 120. The access protocol provider system 150 receives the request for the updated virtual access payload from the access protocol provider system 150 via the network 120.

In block 750, the access protocol provider system 150 generates the updated virtual access payload and transmits the updated virtual access payload to the account hub computing system 140. The access protocol provider system 150 generates the updated virtual access payload based on the received access permission data associated with the user account hub system account. The access protocol provider system 150 associates the updated virtual access payload with the access card identifier. The access protocol provider system 150 stores the updated virtual access payload and the access card identifier in the data storage unit 155 of the access protocol provider system 150. The access protocol provider system 150 transmits, via the network 120, the updated virtual access payload to the account management system 160 via the network 120. The updated virtual access payload comprises a subsequent cryptographic key different from the cryptographic key in the previous virtual access payload associated with the access card identifier. The subsequent cryptographic key is used to establish secure communication between the access reader computing device 130 and the user computing device 110. In this example, the protocol provider system 150 transmits the subsequent cryptographic key to the access reader computing device 130 via the network 120. In an example, the updated virtual access payload is formatted by the access protocol provider system 150 so that it is intelligible or otherwise readable by the access reader computing device 130 and so that the updated virtual access payload is formatted to correspond to a wireless communication protocol used by the access reader computing device 130.

In block 760, the account hub computing system 140 receives the updated virtual access payload from the access protocol provider system 150 and transmits the updated virtual access payload to the account management system 160. The account hub computing system 140 receives, via the network 120 from the access protocol provider system 150, the updated virtual access payload generated by the access protocol provider system 150 in response to transmitting the request for an updated virtual access payload for the user 101 account. The account hub computing system 140 transmits the updated virtual access payload to the account management system 160 via the network 120 in response to the request for the updated virtual access payload. The account management system 160 receives the updated virtual access payload from the account hub computing system 140 via the network 120 in response to sending the request for the updated virtual access payload. The account management system 160 saves the access card identifier and received updated virtual access payload to the user 101 account. The account management system 160 associates the updated virtual access payload and the access card identifier with the user 101 account identifier and the user account hub system account identifier. The account management system 160 stores the received virtual access payload in the data storage unit 165 of the account management system 160. The updated virtual access payload and access card identifier are associated with the user's account hub system account with the account hub computing system 140.

From block 760, the method 270 proceeds to block 790.

In block 790, the account management system 160 transmits the updated virtual access payload to the user computing device 110. The account management system 160 transmits the updated virtual access payload to the user computing device 110 via the network 120 in response to the notification of the refresh event for the virtual access payload received from the user computing device 110. The access manager application 119 on the user computing device 110 receives the updated virtual access payload via the network 120 from the account management system 160. The user computing device 110 stores the updated virtual access payload and the access card identifier in the data storage unit 113. The access manager application 119 associates the updated virtual access payload and the access card identifier with the user account hub system account identifier.

From block 790, the method 270 proceeds to block 280 in FIG. 2.

Returning to FIG. 2, in block 280, the user computing device 110 communicates the virtual access payload to an access reader computing device 130. The method for communicating, by a user computing device 110, a virtual access payload to an access reader computing device 130 is described in more detail hereinafter with respect to the method 280 described in FIG. 8.

Figure 8:
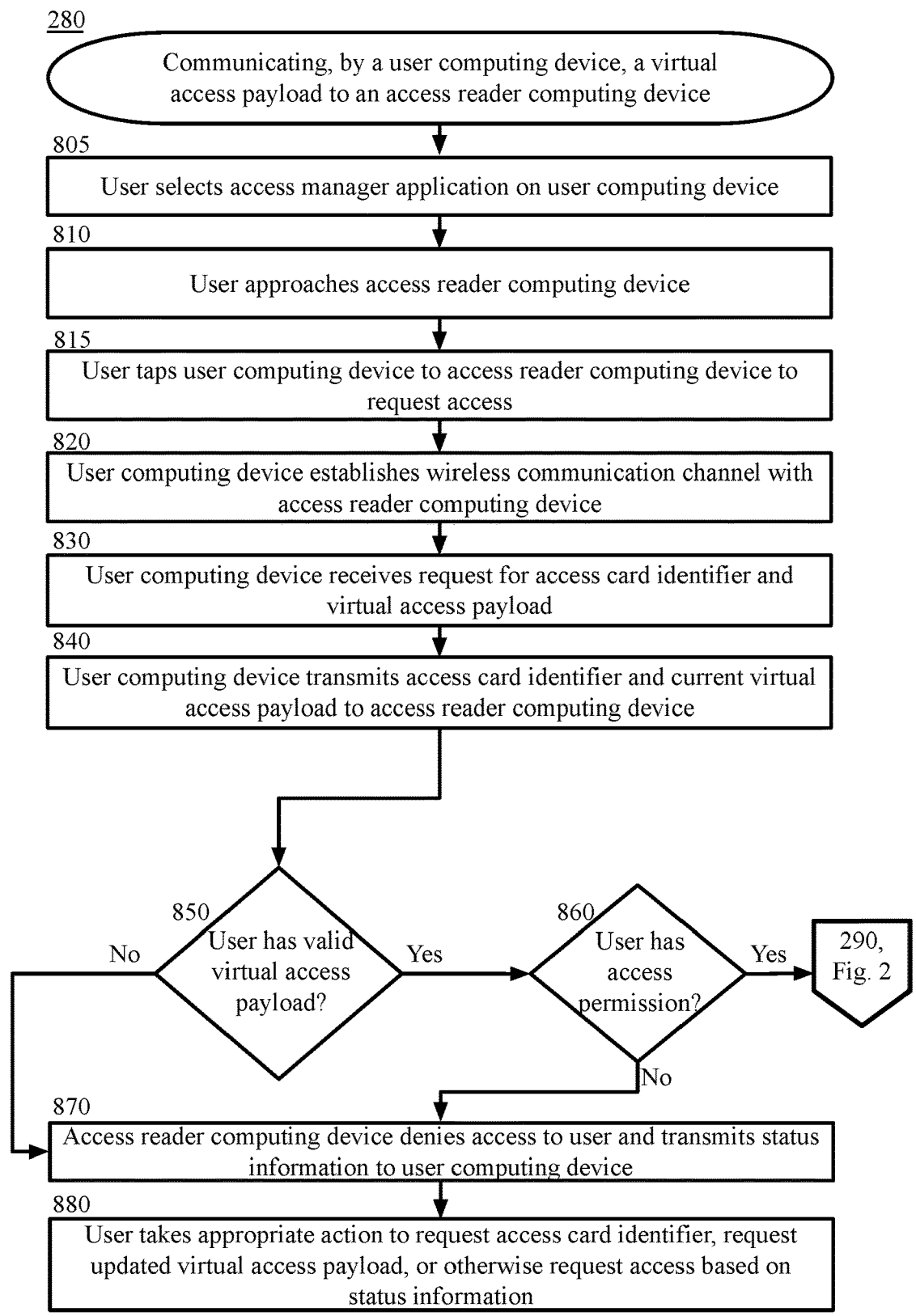
FIG. 8 is a block flow diagram depicting a method to communicate, by a user computing device, a virtual access payload to an access reader computing device, in accordance with certain examples.

FIG. 8 is a block flow diagram depicting a method 280 for communicating, by a user computing device 110, a virtual access payload to an access reader computing device 130, as referenced in block 280. The method 280 is described with reference to the components illustrated in FIG. 1.

In block 805, the user 101 selects the access manager application 119 on the user computing device 110. The user 101 selects the access manager application 119 by actuating one or more objects on the user interface 111 of the user computing device 110. In response to selecting the access manager application 119 on the user computing device 110, the user computing device 110 generates a radio frequency (RF) or other field polling for the presence of an access reader computing device 130. In some examples, an access reader computing device 130 operator activates the RF field or other field to poll for the presence of a user computing device 110 using an application 139 on the access reader computing device 130. In response to selecting the access manager application 119 on the user computing device 110 and selecting a particular virtual access card, the user computing device 110 may display, via the user interface 111, a dynamic barcode representing the access card identifier and the virtual access payload or updated virtual access payload.

In block 810, the user 110 approaches the access reader computing device 130. In an example, the access reader computing device 130 comprises a computing device at a toll booth. In another example, the access reader computing device 130 comprises a device that controls a gate or other access at a place of employment. In yet another example, the access reader computing device 130 comprises a point of sale computing device. The access reader computing device 130 may comprise a computing device that controls access to a physical space, goods, services, and/or data. The user 101 approaches the access reader computing device 130 with the user computing device 110, having selected the access manager application 119 on the user computing device 110. The user 101 may select the access manager application 119 on the user computing device 110 after approaching the access reader computing device 130 with the user computing device 110.

In block 815, the user 101 taps the user computing device 110 to the access reader computing device 130 to request access. The user 101 may move the user computing device 110 and/or arrange the physical orientation of the user computing device 110 so that the access reader computing device 130 and the user computing device 110 are within a threshold proximity necessary to establish and maintain a wireless communication channel. The user computing device 110 may be affixed to a vehicle and the user 101 drives the vehicle or the vehicle is otherwise directed to drive so that the user computing device 110 and the access reader computing device 130 are within a threshold proximity necessary to establish and maintain a wireless communication channel. The wireless communication channel comprises an NFC communication channel, a Bluetooth communication channel, an RFID communication channel, a BLE communication channel, a Wi-Fi communication channel, an infrared communication channel, an ultrasound communication channel, or other wireless communication channel. In an example embodiment, the required proximity distance between the devices (including devices 110 and 130) is defined by the type of RF wireless communication channel established. NFC communication distances generally range from about 3 to about 4 inches. In an example embodiment, the user 101 "taps" the NFC-enable user computing device 110 in the RF field of the access reader computing device 130 by moving the user computing device 110 within the predefined proximity of the access reader computing device 130. In an example embodiment, the predefined proximity is based at least in part on the strength of the generated RF field and/or the type of wireless communication used by the devices (including devices 110 and 130). The user 101, instead of tapping the user computing device 110 to the access reader computing device 130 to establish a wireless communication channel with the access reader computing device 130, may present a displayed dynamic barcode displayed via the user interface 111 to the access reader computing device 130 to scan via the access reader computing device 130.

In block 820, the user computing device 110 establishes a wireless communication channel with the access reader computing device 130. In an example embodiment, the access reader computing device 130 detects the presence of the user computing device 110. In an example, the access reader computing device 130 detects when the user computing device 110 is moved into the RF field and/or moved within the predefined proximity of the access reader computing device 130. In another example, the user computing device 110 detects the access reader computing device 130. In an example embodiment, the detection of the physical proximity of the user computing device 110 ensures that the reader computing device 130 is communicating with only one user computing device 110. The detection of the physical proximity of the user computing device 110 ensures that the reader computing device 130 is physically present within the RF field or other wireless output generated by the user computing device 110.

In an example embodiment, access reader computing device 130 requests a secure communication channel with the user computing device 110. In an example embodiment, the user computing device 110 access manager application 119 and the access reader computing device application 139 establish any number of protocols to enable a secure communication, including but not limited to NFC protocols, BLE protocols, Bluetooth protocols, Wi-Fi protocols, ultrasound protocols, infrared protocols, audible sound protocols, RFID protocols, or other appropriate wireless communication protocols. In an example embodiment, the user computing device 110 and the access reader computing device 130 exchange a key to set up a secure wireless communication channel. In an example embodiment, the wireless communication channel can comprise secure communication functionality, such as cryptographic protocols, including transport layer security or secure socket layer protocols, or other secure communication methodology.

In an example, the access reader computing device 130 receives the secure communication channel request. In another example, the user computing device 110 receives the communication channel network request from the access reader computing device 130. In an example, the access reader computing device 130 accepts the secure communication channel request. In another example, the user computing device 110 accepts the secure communication channel request. In an example embodiment, during this process, the access reader computing device 130 and the user computing device 110 establish a secure communication relationship by creating an encryption key for use in encrypting communications between the devices (including devices 110 and 130).

In block 830, the user computing device 110 receives a request for an access card identifier and a virtual access payload. The access manager application 119 on the user computing device 110 receives, via the established wireless communication channel with the access reader computing device 130, the request for an access card identifier and a virtual access payload. The access reader computing device 130 transmits an account hub computing system 140 identifier identifying a particular account hub computing system 140 for which the access reader computing device 130 accepts access card identifiers. The access manager application 119 searches the user 101 account for an access card identifier associated with a user account hub system account identifier associated with the particular account hub computing system 140. In some examples, the user computing device 110 comprises access card identifiers and corresponding virtual access payloads for multiple user account hub system accounts associated with multiple account hub computing systems 140.

In block 840, the user computing device 110 transmits the access card identifier and a current virtual access payload to the access reader computing device 130. The access manager application 119 identifies the access card identifier and corresponding virtual access payload corresponding to the user's account hub system account associated with the account hub computing system 140 for which the access reader computing device 130 is requesting data. The access manager application 119 previously detected a refresh event and requested and received an updated virtual access payload from the account hub computing system 140 via the account management system 160. In this example, the access manager application 119 identifies the access card identifier and corresponding updated virtual access payload corresponding to the user's account hub system account associated with the account hub computing system 140 for which the access reader computing device 130 is requesting data. In an example, the user computing device 110 transmits the access card identifier and the virtual access payload or updated virtual access payload to the access reader computing device 130 via the established wireless communication channel. In another example, the user computing device 110 generates a dynamic barcode or other image display via the user interface 111 comprising data representing the virtual access payload and the access card identifier and the access reader computing device 130 scans, via a scanner device on the access reader computing device 130, the dynamic barcode to read the data comprising the virtual access payload and the access card identifier.

In block 850, the access reader computing device 130 verifies the virtual access payload. In an example, the access reader computing device 130 receives the access card identifier and the virtual access payload via the wireless communication channel established with the user computing device 110. In another example, the access reader computing device 130 reads the access card identifier and the virtual access payload from a dynamic barcode displayed via the user interface 111 of the user computing device 110. The virtual access payload comprises a cryptographic key that is used by the access reader computing device 130 to decode or otherwise read the virtual access payload. In another example, the virtual access payload comprises a passcode generated for the user account hub system account and associated with the access card identifier and verifying the virtual access payload comprises finding a correspondence between the passcode in the virtual access payload and the password associated with the access card identifier. In another example, the access reader computing device 130 communicates the received virtual access payload and access card identifier via the network 120 to the account hub computing system 140. In this other example, the account hub computing system 140 receives the virtual access payload and the access card identifier via the network 120 from the access reader computing device 130 and verifies the virtual access payload.

If the access reader computing device 130 determines that the user computing device 110 has not provided a valid virtual access payload, the method 280 proceeds to block 870. A passcode in the virtual access payload may not correspond with a passcode associated with the access card identifier.

In block 870, the access reader computing device 130 denies access to the user 101 and transmits status information to the user computing device 110. In response to determining that the user computing device 110 provided an invalid or unrecognized virtual access payload, the access reader computing device 130 does not provide access to the user 101. Examples of denying access include declining to open a gate, door, to a physical area, not enabling user 101 use of the access reader computing device 130, not enabling user 101 use of a device communicatively coupled to the access reader computing device 130, not processing one or more service requests, not providing data to the user computing device 110, or other appropriate denial of access. The access reader computing device 130 transmits status information to the user computing device 110 for display by the user computing device 110. Example status information explains why the access reader computing device 130 denied access. The status information may read "unrecognized virtual access payload." The access reader computing device 130 can display, via an interface of the access reader computing device 130, the status information instead of or in addition to transmitting the status information to the user computing device 110.

In block 880, the user 101 takes appropriate action to request an access card identifier, request an updated virtual access payload, or otherwise request access based on status information. The user 101 selects the access manager application 119 and selects one or more user interface 111 objects to request that the virtual access payload be refreshed. In certain examples, in response to the user 101 selecting one or more objects on the user interface 111, the access manager application 119 transmits a notification of a refresh event to the account management system 160, which transmits a request to update the virtual access payload to the account hub computing system 140. In certain examples, in response to receiving the request to update the virtual access payload, the account hub computing system 140 generates and transmits an updated virtual access payload to the user computing device 110 via the account management system 160. In response to receiving the request to update the virtual access payload, the account hub computing system 140 can request and receive an updated virtual access payload from the access protocol provider system 150 and transmits the received updated virtual access payload to the user computing device 110 via the account management system 160. In this example, having received the updated virtual access payload on the user computing device 110, the user 101 taps the user computing device 110 to the access reader computing device 130 a second time or otherwise requests a display of a dynamic barcode to communicate the access card identifier and the updated virtual access payload to the access reader computing device 130 to request access a second time. The user 101 can interact with an operator of the access reader computing device 130 to negotiate access via an alternative means. The alternative means may comprise conducting a cash or credit transaction or conferring with the operator to find the user 101 on an access list. The access reader computing device 130 may comprise a computing device at a toll booth and, in response to the user 101 being denied access via an NFC tap, the user 101 pays a toll to the operator and the operator instructs the access reader computing device 130 to provide access to the user 101.

Returning to block 850, if the access reader computing device 130 determines that the user computing device 110 has provided a valid virtual access payload, the method 280 proceeds to block 860. A passcode in the virtual access payload may correspond to a passcode associated with the access card identifier.

In block 860, the access reader computing device 130 determines whether the user 101 has access permission based on the access card identifier. The access reader computing device 130 accesses the user account hub system account and retrieves a list of user access permissions associated with the access card identifier and determines whether the requested access permission corresponds with an access permission in the list of user access permissions. In other examples, the access reader computing device 130 communicates the access card identifier via the network 120 to the account hub computing system 140 and the account hub computing system 140 accesses the user account hub system account, retrieves a list of user access permissions associated with the access card identifier, and determines whether the requested access permission corresponds with an access permission in the list of user access permissions.

If the access reader computing device 130 determines that the user 101 does not have access permission based on the access card identifier, the method 280 proceeds to block 870. The access reader computing device 130 or the account hub computing system 140 does not recognize the access card identifier as corresponding to a user account hub system account or the access card identifier is unintelligible. In an example, the access reader computing device 130 accesses the user account hub system account and retrieves a list of user access permissions associated with the access card identifier and determines that the requested access permission does not correspond with any access permission in the list of user access permissions. In another example, the access reader computing device 130 communicates the access card identifier via the network 120 to the account hub computing system 140 and the account hub computing system 140 accesses the user account hub system account, retrieves a list of user access permissions associated with the access card identifier, and determines that the requested access permission does not correspond to any access permission in the list of user access permissions.

In block 870, the access reader computing device 130 denies access to the user 101 and transmits status information to the user computing device 110. In response to determining that the user computing device 110 provided an invalid or unrecognized access card identifier, the access reader computing device 130 does not provide access to the user 101. Examples of denying access include declining to open a gate, door, to a physical area, not enabling user 101 use of the access reader computing device 130, not enabling user 101 use of a device communicatively coupled to the access reader computing device 130, not processing one or more service requests, not providing data to the user computing device 110, or other appropriate denial of access. The access reader computing device 130 transmits status information to the user computing device 110 for display by the user computing device 110. Example status information explains why the access reader computing device 130 denied access. The status information may read "unrecognized access card identifier." The access reader computing device 130 can display, via an interface of the access reader computing device 130, the status information instead of or in addition to transmitting the status information to the user computing device 110.

In block 880, the user 101 takes appropriate action to request an access card identifier, request an updated virtual access payload, or otherwise request access based on status information. The user 101 selects the account hub application 118 and selects one or more user interface 111 objects to request creation of an access card via the access manager application 119. In certain examples, the user 101 causes the user computing device 110 to download the account hub application 118 from a website of the account hub computing system 140 and then requests, via the account hub application 118, creation of an access card via the access manager application 119. The account hub computing system 140 generates or otherwise requests and receives from an access protocol provider system 150, an access card identifier and a virtual access payload to provide to the user computing device 110 via the account management system 160. In this example, having received the access card identifier and virtual access payload on the user computing device 110, the user 101 taps the user computing device 110 to the access reader computing device 130 a second time or otherwise requests a display of a dynamic barcode to communicate the access card identifier and virtual access payload to the access reader computing device 130 to request access a second time. The user 101 may interact with an operator of the access reader computing device 130 to negotiate access via an alternative means. The alternative means may comprise conducting a cash or credit transaction or conferring with the operator to find the user 101 on an access list. The access reader computing device 130 may comprise a computing device at a toll booth and, in response to the user 101 being denied access via an NFC tap, the user 101 pays a toll to the operator and the operator instructs the access reader computing device 130 to provide access to the user 101.

Returning to block 860, if the access reader computing device 130 determines that the user 101 has access permission based on the access card identifier, the method 280 proceeds to block 290 in FIG. 2. The access reader computing device 130 accesses the user account hub system account and retrieves a list of user access permissions associated with the access card identifier and determines that the requested access permission corresponds to a particular access permission in the list of user access permissions. The access reader computing device 130 communicates the access card identifier via the network 120 to the account hub computing system 140 and the account hub computing system 140 accesses the user account hub system account, retrieves a list of user access permissions associated with the access card identifier, determines that the requested access permission corresponds to a particular access permission in the list of user access permissions, and sends a command to the reader computing device 130 via the network 120 to grant access to the user 101.

Returning to FIG. 2, in block 290, the access reader computing device 130 grants access to the user 101. In an example, in response to determining that the requested access permission corresponds to a particular access permission in the list of user 101 access permissions, the access reader computing device 130 grants access to the user 101. In another example, in response to the account hub computing system 140 determining that the requested access permission corresponds to a particular access permission in the list of user 101 access permissions, the account hub computing system 140 communicates a request to the access reader computing device 130 via the network 120 to grant access to the user 101 and the access reader computing device 130 provides access in response to receiving the request from the account hub computing system 140. Examples of providing access include opening a gate to a physical area, enabling user 101 use of the access reader computing device 130, enabling user 101 use of a device communicatively coupled to the access reader computing device 130, processing one or more service requests, providing data to the user computing device 110, or other appropriate process.

From block 290, the method 200 returns to block 260, and the access manager application 119 continues to monitor whether a virtual access payload refresh event has occurred. In other examples, the account management system 160 continues to monitor whether a virtual access payload refresh event has occurred. The refresh event may comprise a passage of a threshold amount of time since the virtual access payload was generated, location data of the user computing device 110 indicating that the user computing device 110 is greater than a threshold length from an address associated with the user 101 account, a request received via a user 101 input to the user computing device 110 for a refresh event, a request received from the account hub computing system 140 for a refresh event, or other appropriate refresh event. The refresh event may comprise a request for a refresh event initiated by the user 101 by selecting one or more objects on the user interface 111 to instruct the access manager application 119 to provide an updated virtual access payload.

Additional Examples

Certain examples herein describe application protocol identifiers ("APIs") and interaction models between one or more of account management systems 160, access reader computing devices 130, account hub computing systems 140, and access agency systems 170 to enable the use of user computing devices 110 as ticket or account information presentment devices at reader computing devices 130 of one or more access agency systems 170 comprising transit operators, stores accepting closed loop payments, road tolls and others using account-based systems for granting access permissions. Account-based systems store user 101 account information and access permission information in the cloud a user computing device 110 presents the account identifier of the user account to a reader computing device 130. Systems involved in enabling account information presentment on a user computing device 110 comprise: (a) an account hub application 118 that comprises an application provided by an account hub computing system 140 that enables users 101 to set-up user accounts, purchase tickets, plan journeys, etc. The account hub application 118 executes on the user computing device 110 and communicates with the account hub computing system 140 via the network 120. The account hub application 118 comprises a transit application and the account hub computing system 140 comprises a transit hub system. (b) An access manager application 119 that comprises an application provided by an account management system 160 and downloaded onto the user computing device 110 via the network 120. The access manager application 119 executes on the user computing device 110 and presents ticket data or other account information to access reader computing devices 130. Presenting ticket data or account data may comprise transmitting the account data via a wireless communication channel to one or more access reader computing devices 130 or displaying the ticket data or account data via a user interface 111 of the user computing device 110. (c) An account management system 160 that comprises a server and a website. The account management system 160 communicates, via a network 120, with an account hub computing system 140 to provide user account data to a user computing device 110 for communication to an access reader computing device 130. (d) An account hub computing system 140 that communicates via the network 120 with the account management system 160 and with one or more access reader computing devices 130. The account hub computing system 140 provides user account information or user ticket information and may acquire further information needed for successful ticket information presentment via the user computing device 110. (e) An access protocol provider system 150 that generates the data used by the user computing device 110 during ticket presentment to the access reader computing device 130 in a format or wireless communication protocol understandable to the access reader computing device 130.

In certain examples herein, field-level encryption can be supported and, in certain examples, is used if data needs to be protected after the secure sockets layer ("SSL") connection is terminated, as the data is passed through intermediate servers until it is processed. The virtual access payload can be field-level encrypted. The account management system 160 supports Java Script Object Notation web encryption ("JWE").

In certain examples, the user computing device 110 initiates API calls. Thus, retries/dropped connections/slow connections may happen. In most cases, API calls can be idempotent to allow for easy retries in the case of dropped connections. For user-initiated calls from the user computing device 110, retries on errors can be completely manual, and occur each time the user 101 is willing to take the action to retry (For example, the user retries less than three times on errors, if at all). Some user computing device 110 background tasks are retried automatically if they receive, via the network 120, an error back from the account hub computing system 140. The user computing device 110 uses an exponential backoff strategy with parameters. Example parameters comprise an initial thirty second delay and doubling on every failure to a maximum delay of about one hour (example numbers may be selected to provide desired actions).

In the examples described herein, String fields comprise strings may be unlimited in length and in 8-bit Unicode Transformation Format ("UTF-8") with no characters stripped out. The transit system, the receiver of the request, sanitizes the values coming in if the account hub computing system 140 cannot handle all characters passed in. In the examples described herein, base64 refers to a base64url encoded value. Provisioning URLs at the access hub computing system 140 and at the account management system 160 are hosted on the following path structure: prefix_specific_to_transit_hub_integration/gp/major_version/minor_version/apiName. In general, minor version updates are backwards compatible, while major version updates are not. Requests and responses may be formatted as Java Script Object Notation ("JSON"). APIs may be accessed using hypertext transfer protocol ("HTTP") POST A threshold connection timeout comprises twenty seconds.

Requests may comprise a requestContext in the request body. A requestID string comprises a unique identifier for the request, can be rotated for every retry, and may comprise a maximum forty (40) character string. A requesterID string comprises a unique id assigned by the account hub computing system 140 that identifies the account management system 160 on calls from account management system 160 to the account hub computing system 140. The requesterID string may comprise a unique id assigned by the account management system 160 that identifies the account hub computing system 140 on calls from the account hub computing system 140 to the account management system 160. A correlationID string is used for debugging, tying together requests across servers handling the same request, as well as requests for a given flow (e.g. a provisioning attempt or a replenish attempt). The correlationID value may not be guaranteed to be the same through an entire provisioning session so it may not be used to drive business logic. An example correlationID comprises a maximum forty (40) character string.

Responses may comprise a responseContext in the response body. A requestID string comprises a requestID from a corresponding request. A responseCode string comprises a code indicating success, or a reason why the request failed. In certain examples, for non-success codes, this responseContext is filled in and all the other fields outside of responseContext are unset (missing). A responseMessage comprises a string message adding more detail about what failed and may be used for debugging. In the case of validation errors, the responseContext includes a list of all fields that failed validation.

HTTP Response codes can be set as follows: 200 is used for most responses, even if the request processing is not successful. If there was any issue encountered during request processing, the responseCode and responseMessage is used to give more detail about what might have gone wrong. 500 is used when an unexpected error occurred while processing the request, the request may be retried on a schedule that backs off exponentially. This HTTP response code is used in cases where it may not be possible to populate a responseContext with more information about what went wrong with the request. In some examples, 500s are considered system downtime and are monitored and investigated by on-call engineers. 503 indicates that an account hub computing system 140 server is overloaded. The request may be retried on a schedule that backs off exponentially. In some examples, 503 is considered system downtime and is monitored accordingly.

Example payload management APIs include digitizeAccessCard, refreshAccessPayload, AccessPayloadUpdateNeeded, and deleteAccessCard. An example payload management API comprises digitizeAccesscard. An example digitizeAccesscard request comprises a requestContext object, a digitizationContext object, an accountID string indicating an identifier of the user account hub system account to be digitized, a deviceData object, and riskData object comprising risk management data. An example digitizeAccesscard response comprises a responseContext object, an accessCardID string indicating an access card identifier to be added to the access manager application 119 and/or user 101 account, and a virtual access payload.

Another example payload management API comprises refreshAccessPayload. An example refreshAccessPayload API is associated with a call sent from the account management system 160 to the account hub computing system 140 and is used to refresh an existing virtual access payload. An example refresh event of a virtual access payload may be triggered by the account management system 160 when one or more keys in the virtual access payload are running out or are about to expire.

Another example payload management API comprises AccessPayloadUpdateNeeded. The account hub computing system 140 can notify the account management system 160 that a refresh event for the virtual access payload associated with the access card identifier is needed using the accessPayloadUpdateNeeded API call. An example accessPayloadUpdateNeeded API call includes a request comprising a requestContext object, a digitizationContext object, an accessCardID string comprising the access card identifier for which to refresh the virtual access payload, and an accessPayloadID string comprising the virtual access payload currently stored on the user computing device 110. The example accessPayloadUpdateNeeded API call includes a response comprising a responseContext object and an accessPayload object comprising the subsequent virtual access payload Another example payload management API comprises deleteAccessCard. An example deleteAccessCard API call includes a request comprising a requestContext object, a digitizationContext object, an accessCardID string comprising the access card identifier for deletion, and a deletionReason enum.

Example display data APIs for displaying user account hub system account metadata to users 101 via the user computing device 110 comprise getAccountMetadata, getTransactions, and GetStatic Content. An example getAccountMetadata API call includes a request comprising a requestContext object and an accountID string comprising a user account hub system account identifier associated with the user account hub system account associated with the account hub computing system 140 and includes a response comprising a responseContext object and an accountMetadata object. An example accountMetadata object comprises one or more of a ticketIDs string comprising an array of identifiers for all tickets or access permissions associated with the user account hub system account, a cardArtStaticContentId string, accessHubAgencyData object, and an accessHubAgencyApp object. An example cardArtStaticContentId string comprises an identifier to pass to the getStaticContent API to download a card art image. In most cases the card art image comprises the image that represents physical cards that consumers can purchase to use at the given account hub computing system's 140 or access agency system's 170 infrastructure. An example accessHubAgencyData object comprises one or more of an accessHubAgency string, an accessAgencyDisplayName string, an accessAgencyLogoStaticContentID string, an accessAgencyWebsiteUrl string, an accessAgencySupportPhoneNumber string, an accessAgencyEmailAddress string, and a lostAndFoundUrl string. The accessAgencyID string comprises a constant string to represent the account hub computing system 140 and is used to programmatically handle any differences between account hub computing systems 140. A full list of supported account hub computing systems 140 can be provided to the account management system 160. An account hub computing system 140 comprises an access agency system 170. An access agency system 170 comprises an account hub computing system 140. An example accessAgencyDisplayName string comprises a name of the access agency system 170 for display via the user computing device 110. An example accessAgencyLogoStaticContentID string comprises an identifier to pass to the getStaticContent API to download a transit agency logo for a particular access permission. An example accessAgencyWebsiteUrl string comprises a uniform resource locator ("URL") for a website of the access agency computing system 170. An example accessAgencySupportPhoneNumber string comprises a support phone number the user 101 can call to contact the account hub computing system 140. An example accessAgencyEmailAddress string comprises a contact email address of the access agency computing system 170. An example lostAndFoundUrl string comprises a URL for a lost and found account hub computing system 140 website. An example accessAgencyApp object comprises one or more of a packageName string, an action string, and an intentExtraText string. An example packageName string comprises a package name as it is listed in an application distribution system and may be located in application distribution system URL as follows: https://applicationdistributionsystem.com/store/apps/details?id=packageName. An example action string comprises an action of the transit hub application 118 or a native application of the access agency computing system 170, may be used for deep linking, and a launch intent may be sent when it is not provided. An example intentExtraText string comprises an extra intent of the transit hub application 118 or native application of the access agency computing system 170 and may be used for deep linking.

Another example API call for displaying user account hub system account metadata to users 101 via the user computing device 110 comprises the getAccessPermissionMetadata API call. An example getAccessPermissionMetadata API call includes a request comprising a requestContext object and an accessPermissionID string comprising an access permission identifier or ticket identifier. The example getAccessPermissionMetadata API call includes a response comprising a responseContext object and an accessPermissionMetadata object. An example accessPermissionMetadata object comprises one or more of an accessPermissionType enum, a purchaseDetails object, a displayTosUrl string, a privacyPolicyUrl string, a refundWebsiteUrl string, a concessionCategory enum, a fareClass enum, an accessPermissionValidityParameter object, an accessPermissionConditions string, and an additionalSupportedAccessAgenciesData object. An example accessPermissionType enum comprises a type of the access permission, for example a fixed value permission, a single use permission, a multiple use permission, or a carnet permission. An example purchaseDetails object comprises a purchaseReceiptNumber string, a purchaseTime dateTime, an accessPermissionCost object, a purchaseMethod enum, and a repurchaseUrl string. An example purchaseReceiptNumber string comprises a receipt number or identifier for tracking the access permission purchase via an entity that sold the access permission and may be displayed in the user interface 111 of the user computing device 110. An example PurchaseTime dateTime comprises a purchase date and time of the original access permission purchase in an example format of ISO 8601, YYYY-MM-DDThh:mm:ssTZD. An example accessPermissionCost object comprises a cost of the access permission. An accessPermissionCost object comprises a currencyCode string indicating a three-letter currency code defined in ISO 4217, an integer amount indicating a number of micros ($10^-6$) units of the amount (for example \$5USD is represented as 5000000) and an integer discountPercent indicating a price discount in percent. An example purchaseMethod enum comprises an indication of a method by which the access permission was purchased, for example, a web purchase or an app purchase. An example repurchaseUrl string comprises a URL to enable a repurchase of the same access permission. An example displayTosUrl string comprises a link to a URL hosting terms and conditions to be displayed on an access permission details screen. An example privacyPolicyUrl string comprises a link to a URL hosting a privacy policy to be displayed on the access permission details screen. An example refundWebsiteUrl string comprises a link to a URL for a refund website for a particular access permission. An example concessionCategory enum comprises a concession category for the access permission for example, adult, child, disabled, military, student, senior citizen, or other concession category. An example fareClass enum comprises a fare class for the access permission, for example, business class, first class, standard class, or other fare class. An example accessPermissionConditions string comprises free text for access permission conditions present in an account hub computing system's 140 default locale. An example additionalSupportedAccessAgenciesData object comprises an array of additional accessAgencyData objects for account hub computing systems 140 different from the one associated with the user account hub system account. (For example, it is possible for the array to be empty if there are no such account hub computing systems 140).

Another example API call for displaying user account hub system account metadata to users 101 via the user computing device 110 comprises the getTransactions API call. An example getTransactions API call comprises a call from the account management system 160 to the account hub computing system 140. This example API call is to retrieve transaction details for a user account hub system account. The response may include all user account hub system account transactions that have been added or updated since the time represented by the lastUpdatedToken provided in the request. If no lastUpdatedToken is provided in the request, all transactions for one year or other appropriate time period prior to the request may be returned. An example request in the getTransactions API call comprises one or more of a requestContext object, a digitizationContext object, a digitalCardID string, a digitalAccessPermissionID string, and a lastUpdatedToken string. An example digitalCardID string comprises the access card identifier. The digitalAccessPermissionID comprises an identifier associated with an access permission. The lastUpdatedToken string comprises an opaque token returned in a previous getTransactions call that can be used to limit returned user account hub system account transactions to those that have been added or updated since a time represented by the token. If no transactions are provided, the response may include all user account hub system account transactions for one year or other appropriate time period prior to the request. An example response in the getTransactions API call comprises a responseContext object, a lastUpdatedToken string, and a transactions object. An example lastUpdatedToken object comprises an opaque token that can be included in future getTransactions request to limit user account hub system account transactions returned to those added or updated since the last API call. An example transactions object comprises all of the user account hub system account transaction details for the user account hub system account that have been added or updated since the included lastUpdatedToken. The example transactions object may include one or more transactionTimestamp dateTimes including a date and time when the transaction occurred in the time zone of the access agency computing system 170. In some examples, the time zone component is required and must be accurate, for example, a time zone designator ("TZD") may comprise pacific standard time ("PST") or pacific daylight time ("PDT") for a transaction that took place in California. In other examples, the time zone component is not required. The timestamp may be in the format of ISO 8601, YYYY-MM-DDThh:mm:ssTZD.

Another example API call for displaying user account hub system account metadata to users 101 via the user computing device 110 comprises the getStaticContent API call. An example getStaticContent API call comprises a call from the account management system 160 to the account hub computing system 140. The getStaticContent API is used to fetch static content, like terms of service documents and card images/transit agency logos. The content can be immutable once the staticContentId is generated. If the ToS is updated it can be assigned a new staticContentId. The staticContentId is unique globally (e.g. not namespaced on a per account basis). The account management system 160 may cache static content so that if a different user digitizes a user account hub system account with the same card art the image may not be fetched again. An example request in the getStaticContent API call comprises a requestContext object and a getStaticContentID string comprising an identifier of the content to be downloaded. An example response in the getStaticContent API call comprises a responseContext object, a contentType enum, and a content string. An example contentType enum comprises example values for corresponding format types, for example image/png, text/plain, or text/html. An example content string comprises static content that is base64 encoded.

Example purchase API calls comprise a purchaseAccessPermission API, a reversePurchase API, a getAllProductDetails API, and a getProductPrices API. An example purchaseAccessPermission API call comprises a call from the account management system 160 to the account hub computing system 140. An example request in the purchaseAccessPermission API call comprises a requestContext object, an accessAgencyID string, a purchaseOrderID string, a paymentDetails object, and a purchaseLineItem object. An example accessAgencyID string comprises an identifier of an access agency computing system 170. An example purchaseOrderID string comprises a generated order number for this request for which a response may be idempotent for this generated order number. An example paymentDetails object comprises one or more of a currencyCode string, an integer amount, and an encryptedTokenInfo string. An example purchaseLineItem object comprises details covering an individual item to be purchased. An example response in the purchaseAccessPermission API comprises one or more of a responseContext object, an affectedAccessPermissionID string, and a declineReason enum. An example affectedAccessPermissionID comprises an access permission identifier and an example declineReason enum comprises an explanation for a declined transaction.

Another example purchase API call comprises a reversePurchase API call. The reversePurchaseAPI call is made from the account management system 160 to the account hub computing system 140 and may be used to either cancel or reverse a previous purchase of an access permission on the user account hub system account. This API may be used if a purchase was initiated but success is uncertain (e.g. unclear error was returned to the client) or purchase was successfully initiated but digitization is not complete (e.g. user exits digitization flow, or account hub computing system 140 returns fatal error on digitizeAccessCard). An example request in a reversePurchase API call comprises a requestContext object, an accessAgencyID string, a purchaseOrderID string, and a reversalReason string. An example accessAgencyID string comprises an identity of an access agency computing system 170. An example purchaseOrderID string comprises a generated order number for the request that the API call is intending to reverse. An example reversalReason string comprises a reason the purchase is being reversed. An example response in the reversePurchase API call comprises a responseContext object.

Another example purchase API call comprises a getAllProductDetails API call. The getAllProductDetails API call is made from the account management system 160 to the account hub computing system 140 and may be used to provide descriptions for all available purchase options. The response in this API call may be cached by the account management system 160 on an access agency computing system 170 level or on an account hub computing system 140 level. An incoming account hub computing system 140 event can be used to notify the account management system 160 that the product details cache can be invalidated. An example request in the getAllProductDetails API call comprises a requestContext object and an accessAgencyID object. An example accessAgencyID object comprises a unique identifier of the access agency computing system 170 for which the user 101 wishes to acquire an access permission. An example response in the getAllProductDetails API call comprises a responseContext object and an accessPermissonPurchaseOptions object. An example accessPermissonPurchaseOptions object comprises a list of access permissions available for digitization.

Another example purchase API call comprises a getProductPrices API call. The getProductPrices API call is made from the account management system 160 to the account hub computing system 140 and may be used to retrieve a list of prices. In certain examples, this is called with a filtered list of purchase option IDs (e.g. IDs representing all duration options under 'Zone 1-4' Full Fare) in a user 101 context. An example request in the getProductPrices API call comprises a requestContext object, an accessAgencyID string, a purchaseOptionID string, and a virtualAccessPayload object. An example accessAgencyID string comprises a unique identifier of account hub computing system 140 or access agency computing system 170 for which the user 101 wishes to acquire an access permission. An example, purchaseOptionID string comprises a list of unique access permission purchase option identifiers. An example virtualAccessPayload object comprises a current virtual access payload from the user computing device 110, if one currently exists. The virtualAccessPayload object may be used for pricing decisions (for example, the presence of an existing card can eliminate the 'card price'). An example response in the getProductPrices API call comprises a responseContext object and a productPrice object. An example productPrice object comprises a purchaseOptionID string, a receiptItem object, and a totalBaseCost object. An example purchaseOptionID string comprises a unique identifier for the account hub computing system 140 or the access agency computing system 170 for which the user 101 wishes to acquire the access permission. An example receiptItem object comprises a list of individual receipt items, and may comprise, for each item, a description string and a cost string. An example description string comprises a readable description of a broken-down cost (for example a 'Card Fee', or 'Tax). An example cost string comprises a currencyCode string and an integer amount. An example totalBaseCost object comprises a total cost of the access permission. For value access permissions, the totalBaseCost object may represent a cost of any fees associated with the purchase (i.e., Potentially $0, or more if there are card fees).

Example account hub computing system 140 event notification API calls comprise an accountMetadataUpdated API call, an accessPermissionMetadataUpdated API call, a virtualAccessPayloadUpdated API call, and an accessTransactionEvent API call. An example AccountMetadataUpdated API call is made from the account hub computing system 140 to the account management system 160. An example AccountMetadataUpdated API call notifies he account management system 160 that user account hub system account metadata has been updated. An example request in the accountMetadataUpdated API call comprises a requestContext object and an accountID string comprising an identifier of the user account hub system account that was updated. An example response in the accountMetadataUpdated API call comprises a responseContext object.

Another example account hub computing system 140 event notification API call is an accessPermissionMetadataUpdated API call. An example accessPermissionMetadataUpdated API call is made by the account hub computing system 140 to the account management system 160. An example request in the accessPermissionMetadataUpdated API call comprises a requestContext object and an accessPermissionID string comprising an identifier associated with an access permission for which metadata was updated. An example response in the accessPermissionMetadataUpdated API call comprises a responseContext object.

Another example account hub computing system 140 event notification API call is a virtualAccessPayloadUpdated API call. An example virtualAccessPayloadUpdated API call is made by the account hub computing system 140 to the account management system 160. An example request in the virtualAccessPayloadUpdated API call comprises a requestContext object and an accessCardID string comprising the access card identifier for which the virtual access payload was updated. An example response in the accessPermissionMetadataUpdated API call comprises a responseContext object.

Another example account hub computing system 140 event notification API call is an accessTransactionEvent API call. An example accessTransactionEvent API call is made by the account hub computing system 140 to the account management system 160. An example request in the accessTransactionEvent API call comprises a requestContext object and an accessCardID string comprising the access card identifier which was used to perform a transaction. An example response in the accessTransactionEvent API call comprises a responseContext object.

Example testing API calls are made from the account management system 160 to a trusted service provider ("TSP") or from the TSP to the account management system 160. The purpose of this API is to test basic connectivity between TSP and account management system 160, optionally including field-level encryption and decryption. An example testing API call is a ping API call. An example request in the ping API call comprises a requestContext object and an encrypted RequestPayload string comprising a JWE encrypted requestPayload, a string used to verify JWE encryption and decryption. An example response in the ping API call comprises a responseContext object and an encryptedResponsePayload string comprising a JWE encrypted responsePayload. The responsePayload can be the same as the requestPayload.

The technology described herein provides an end to end cloud-based transit framework that enables account hub computing systems 140 to support cloud-based (aka, account-based) accounts, including the following operations: (a) provisioning an access card to a user computing device 110; (b) fetching information from the cloud to visualize user account hub system account information on a user computing device 110 (c) tapping the user computing device 110 and conveying account information to an access reader computing device 130; and (d) adding value (e.g., balance, access permissions) to an existing user account hub system account from a user computing device 110. The framework allows performance of all operations above in a secure, reliable, and scalable way. The solution can be easily extended to support use cases including transit, in-store purchases, toll fee systems, or other contexts.

Other Examples

FIG. 9 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. A user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative examples, certain acts can be performed in a different order, in parallel with one another, omitted entirely, and/or combined between different examples, and/or certain additional acts can be performed, without departing from the scope and spirit of various embodiments. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to provide access information to reader computing devices, comprising:
    by one or more computing devices,
        receiving, from a user computing device, a user account identifier and a request for a virtual access card corresponding to the user account identifier, the user account identifier associated with an access system account;
        transmitting, to an access computing system corresponding to the access system account, a request for an access card identifier and an access key based on the received user account identifier;
        receiving, from the access computing system, the access card identifier and the access key, the access card identifier and the access key being formatted based on a communication protocol corresponding to a reader computing device utilized by the access computing system;
        transmitting the access card identifier and the access key to the user computing device, the user computing device communicating the access card identifier and the access key to the reader computing device via a wireless communication channel;
        detecting a refresh event; and
        in response to detecting the refresh event, transmitting an updated access key to the user computing device, the user computing device associating the updated access key with the access card identifier.

2. The computer-implemented method of claim 1, wherein the access key comprises a first key, and wherein the reader computing device grants access in response to verifying the first key.

3. The computer-implemented method of claim 1, wherein:
    detecting the refresh event comprises receiving, from the user computing device, a notification of a refresh event for the access key associated with the access card identifier;
    the method further comprises:
        receiving, from the account hub computing system, the updated access key; and
        transmitting the updated access key to the user computing device, the user computing device associating the updated access key with the access card identifier.

4. The computer-implemented method of claim 3, wherein the access key comprises a first key, and wherein the updated access key comprises a second key different from the first key.

5. The computer-implemented method of claim 4, wherein the user computing device communicates the access card identifier and the updated access key to the reader computing device via the wireless communication channel, and wherein the reader computing device grants access in response to verifying the second key.

6. The computer-implemented method of claim 3, wherein the notification of the refresh event is based on at least one of timestamp data associated with the user computing device, location data associated with the user computing device, or a user input to the user computing device.

7. The computer-implemented method of claim 1, further comprising, by the one or more computing devices:
    transmitting, to the access computing system associated with the access card identifier, a request for metadata; and
    receiving, from the access computing system, access system metadata associated with the account identifier.

8. The computer-implemented method of claim 7, further comprising, by the one or more computing devices, transmitting, to the user computing device, an instruction to display at least a portion of the metadata in response to receiving a request from the user computing device for information about the access system account.

9. The computer-implemented method of claim 7, wherein the access system metadata comprises information describing one or more access permissions associated with the access system account.

10. The computer-implemented method of claim 9, wherein the one or more access permissions comprise one or more of a ticket, pass, loyalty program identifier, or receipt identifier.

11. The computer-implemented method of claim 1, wherein the wireless communication channel comprises one of NFC, RFID, Bluetooth low energy, ultrasound, infrared, or Wi-Fi, and wherein a threshold proximity between the user computing device and the reader computing device is defined dependent on the wireless communication channel.

12. The computer-implemented method of claim 1, wherein the access computing system generates the access card identifier and the access key.

13. The computer-implemented method of claim 1, wherein the access computing system receives the access card identifier and the access key from an access protocol provider system.

14. A system to provide access information for communication to reader computing devices, comprising:
- a storage device;
- a processor communicatively coupled to the storage device, wherein the processor executes application code instructions that are stored in the storage device to cause the system to:
  - receive a user account identifier and a request to generate a first virtual access card, the user account identifier associated with a first access system account;
  - in response to receiving the request, transmit, to one or more computing devices, the user account identifier and the request;
  - receive, from the one or more computing devices, a first access card identifier and a first access key, the first access card identifier and the first access key being formatted based on a first communication protocol corresponding to first reader computing devices utilized by a first access computing system;
  - associate the first access card identifier with the first access key;
  - store the first access card identifier and the first access key on a memory, the memory comprising the first access card identifier and the associated first access key and a second access card identifier and an associated second access key;
  - detect a tap of the system to a requesting reader computing device;
  - determine that the first access computing system corresponds to the requesting reader computing device based on data received from the requesting reader computing device; and
  - communicate the first access card identifier and the first access key to the requesting reader computing device via a wireless communication channel using the first communication protocol;
  - determine a refresh event for the first access key has occurred;
  - in response to determining that the refresh event has occurred, transmit, to the one or more computing devices, the access card identifier and a request for an updated first access key for the first access card identifier, the one or more computing devise receiving an updated first access key from the account hub computing system.

15. The system of claim 14, wherein the processor is further configured to execute application code instructions stored in the storage device to cause the system to:
- receive a second user account identifier and a second request to generate second virtual access card, the second user account identifier associated with a second access system account;
- in response to receiving the request, transmit, to one or more computing devices, the second user account identifier and the second request;
- receive, from the one or more computing devices, the second access card identifier and the second access key, the second access card identifier and the second access key being formatted based on a second communication protocol corresponding to second reader computing devices utilized by the second access computing system.

16. The system of claim 14, wherein the processor is further configured to execute application code instructions stored in the storage device to cause the system to:
- determine a refresh event for the first access key has occurred; and
- in response to determining that the refresh event has occurred, transmit, to the one or more computing devices, the access card identifier and a request for an updated first access key for the first access card identifier, the one or more computing devise receiving an updated first access key from the account hub computing system.

17. The system of claim 14, wherein the one or more computing devices generates the first access card identifier and the first access key.

18. The system of claim 14, wherein determining the refresh event for the first access key comprises:
- logging location data of the system;
- determining that the logged location data is greater than a threshold distance from a location associated with the first user account identifier.

19. The system of claim 14, wherein determining the refresh event for the first access key comprises:
- logging a time stamp corresponding to a time at which the first access key is received from the one or more computing devices; and
- determining that a threshold amount of time has passed since the time corresponding to the time stamp.

20. A computer program product to provide access information to reader computing devices, comprising:
- a non-transitory computer-readable medium having computer-executable program instructions embodied thereon that when executed by computer cause the computer to:
  - receive, from a user computing device, a user account identifier and a request for a virtual access card corresponding to the user account identifier, the user account identifier associated with an access system account;
  - transmit, to an access computing system corresponding to the access system account, a request for an access card identifier and an access key based on the received user account identifier;
  - receive, from the access computing system, the access card identifier and the access key, the access card identifier and the access key being formatted based on a communication protocol corresponding to a reader computing device utilized by the access computing system;
  - transmit the access card identifier and the access key to the user computing device, the user computing device communicating the access card identifier and the access key to the reader computing device via a wireless communication channel;
  - detect a refresh event; and
  - in response to detecting the refresh event, transmit an updated access key to the user computing device, the user computing device associating the updated access key with the access card identifier.

* * * * *